(12) United States Patent
Yamamoto

(10) Patent No.: US 9,115,743 B2
(45) Date of Patent: Aug. 25, 2015

(54) FIXING APPARATUS, FIXING APPARATUS REMOVING STRUCTURE AND CURTAIN AIRBAG FIXING APPARATUS

(75) Inventor: Kazuhito Yamamoto, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 13/984,355

(22) PCT Filed: Jul. 30, 2012

(86) PCT No.: PCT/JP2012/069291
§ 371 (c)(1),
(2), (4) Date: Aug. 8, 2013

(87) PCT Pub. No.: WO2014/020655
PCT Pub. Date: Feb. 6, 2014

(65) Prior Publication Data
US 2015/0132078 A1    May 14, 2015

(51) Int. Cl.
*F16B 21/06* (2006.01)
*F16B 21/12* (2006.01)
*F16B 21/08* (2006.01)
*F16B 19/10* (2006.01)
*B60R 21/20* (2011.01)
*B60R 21/213* (2011.01)

(52) U.S. Cl.
CPC .............. *F16B 21/125* (2013.01); *B60R 21/20* (2013.01); *F16B 19/1081* (2013.01); *F16B 21/065* (2013.01); *F16B 21/086* (2013.01); *F16B 21/12* (2013.01); *B60R 21/213* (2013.01)

(58) Field of Classification Search
CPC ..... F16B 19/1081; F16B 21/08; F16B 21/086
USPC ..................... 411/45–49, 508, 913
See application file for complete search history.

(56) References Cited

U.S. PATENT DOCUMENTS

| | | | | |
|---|---|---|---|---|
| 3,908,235 | A * | 9/1975 | Telliard et al. | 411/508 |
| 4,527,821 | A * | 7/1985 | Tanaka | 292/19 |
| 6,616,479 | B1 * | 9/2003 | Jones | 439/567 |
| 6,752,576 | B2 * | 6/2004 | Johansson et al. | 411/21 |
| 7,226,023 | B2 * | 6/2007 | Banno et al. | 248/71 |
| 7,374,200 | B2 * | 5/2008 | Ikeda et al. | 280/728.2 |

(Continued)

FOREIGN PATENT DOCUMENTS

| | | |
|---|---|---|
| DE | 10 2007 042873 B3 | 10/2008 |
| DE | 10 2010 035012 A1 | 2/2012 |
| EP | 2 047 126 A1 | 4/2009 |
| EP | 2 198 170 A2 | 6/2010 |
| EP | 2 439 418 A1 | 4/2012 |

(Continued)

*Primary Examiner* — Flemming Saether
(74) *Attorney, Agent, or Firm* — Oliff PLC

(57) ABSTRACT

A fixing apparatus is provided with a clip body. The clip body includes a body leg. A body engagement hook is formed at the body leg. A groove having a groove bottom surface is formed at the body engagement hook. The groove bottom surface extends from an outside surface to an inside surface of the body engagement hook at a central portion in a width direction of the body engagement hook. A portion of the groove bottom surface including a center axis line-side end is open toward the body head through a lock pin inserting hole. A fixing apparatus removing structure includes the fixing apparatus and a tool. A CSA fixing apparatus includes the fixing apparatus and a CSA. At a time of removing the fixing apparatus, the body engagement hook is displaced inward using the tool. Then, by pulling the tool, the clip body is removed from a body.

15 Claims, 18 Drawing Sheets

(56) References Cited

U.S. PATENT DOCUMENTS

| | | | |
|---|---|---|---|
| 8,037,582 B2 * | 10/2011 | Okada et al. | 24/297 |
| 8,043,038 B2 | 10/2011 | Sano | |
| 8,245,367 B2 * | 8/2012 | Kato et al. | 24/458 |
| 8,961,092 B2 * | 2/2015 | De Jong et al. | 411/508 |
| 2007/0216139 A1 | 9/2007 | Mazanek et al. | |
| 2007/0289770 A1 * | 12/2007 | Koike | 174/153 G |
| 2008/0014045 A1 | 1/2008 | Kawai | |
| 2012/0291240 A1 | 11/2012 | Suzuki | |
| 2013/0183089 A1 | 7/2013 | Podsadny et al. | |

FOREIGN PATENT DOCUMENTS

| | | |
|---|---|---|
| FR | 2 928 428 A1 | 9/2009 |
| JP | A-2008-20006 | 1/2008 |
| JP | A-2008-230363 | 10/2008 |
| JP | 2009-068525 A | 4/2009 |
| JP | 2009-121633 A | 6/2009 |
| JP | A-2010-144900 | 7/2010 |
| JP | A-2011-133014 | 7/2011 |
| JP | 2011-255888 A | 12/2011 |
| WO | 2007/104530 A1 | 9/2007 |

\* cited by examiner

FIXING APPARATUS, FIXING APPARATUS REMOVING STRUCTURE AND CURTAIN AIRBAG FIXING APPARATUS

TECHNICAL FIELD OF THE INVENTION

The present invention relates to a fixing apparatus used for fixing a member to be fixed, to a vehicle body and easily removable from the vehicle body, a fixing apparatus removing structure for removing the fixing apparatus from the vehicle body, and a curtain airbag fixing apparatus using the fixing apparatus. These include the fixing apparatus as a main portion and have the same structure with each other at the main portion. The curtain airbag may be called as "CSA". The CSA is an abbreviation of a Curtain Shield Airbag.

BACKGROUND OF THE INVENTION

Patent Document 1 discloses a conventional fixing apparatus including a clip body having a lock pin inserting hole and a lock pin inserted into the lock pin inserting hole of the clip body, and a conventional CSA fixing apparatus for coupling a CSA to a vehicle body using the fixing apparatus.

The CSA is coupled to the vehicle body using the conventional fixing apparatus as follows:

At a state that the lock pin is inserted to a halfway position of the lock pin inserting hole and is positioned at a temporary holding position, a body leg of the clip body is caused to extend through an aperture of a tab of the CSA and a leg inserting aperture of a spacer and is pushed into a fixing apparatus mounting aperture of the vehicle body. A body engagement hook is provided at the body leg. When the body leg passes through the fixing apparatus mounting aperture of the body, the body engagement hook recedes. When the body leg has passed through the fixing apparatus mounting aperture of the body, the body engagement hook returns to an original position due to an elasticity and engages a back surface of the body. Then, the lock pin is pushed from the temporary holding position to a secure holding position, whereby the body engagement hook cannot recede so that the fixing apparatus is securely fixed to the vehicle body and is locked with the vehicle body.

When it is necessary to remove the fixing apparatus from the vehicle body, for example, at a time of maintenance, etc., at first the lock pin is removed from the clip body using a lock pin removing tool so that the body engagement hook can recede. Then, a clip body removing tool is inserted into a space behind the vehicle body through a narrow clearance between the body leg and the fixing apparatus mounting aperture-defining edge of the vehicle body, and each of a pair of body engagement hooks is caused to recede so that the clip body is extracted from the vehicle body. Alternatively, the clip body is forced to be extracted from the vehicle body.

RELATED ART DOCUMENT

Patent Document

Patent Document 1: Patent Publication JP 2008-020006

BRIEF SUMMARY

Problems to be Solved by the Invention

However, with the conventional fixing apparatus, the conventional fixing apparatus removing structure for removing the fixing apparatus from the vehicle body and the conventional CSA fixing apparatus using the fixing apparatus, there are the following problems to be solved:

(a) It is difficult to remove the fixing apparatus from the vehicle body, because it is difficult to insert the clip body removing tool behind the vehicle body and because it is difficult to push the body engagement hook inwardly at a non-visible space behind the vehicle body.

(b) If the body engagement hook is forced to be extracted from the vehicle body while the body engagement hook is not at a fully receding position, the body engagement hook may be damaged, more particularly, may be broken by the fixing apparatus mounting hole-defining edge of the vehicle body or may be plastically deformed. As a result, it is impossible to use the clip body again.

An object of the invention is to provide a fixing apparatus easily removable from a vehicle body, a removing structure for removing the fixing apparatus from a vehicle body and a CSA fixing apparatus using the fixing apparatus.

Means for Solving the Problems

A fixing apparatus easily removable from a vehicle body, a removing structure for removing the fixing apparatus from a vehicle body, and a CSA fixing apparatus using the fixing apparatus according to the present invention can take the following first to seventeenth embodiments:

A fixing apparatus according to a first embodiment of the present invention comprises a clip body. The clip body includes a body head and a body leg that are arranged in a direction along a center axis line of the clip body. The clip body includes a central hole extending over the body head and the body leg and being open at a body head-side end of the central hole. The body leg includes a body engagement hook elastically deformable in a direction perpendicular to the center axis line of the clip body. The clip body is removable from a vehicle body by a clip body removing tool.

A groove is formed at the body engagement hook. The groove has a groove bottom surface which inclinedly extends from an outside surface of the body engagement hook toward the body head and the center axis line of the clip body.

This structure is applied to both of a fixing apparatus with a lock pin and a fixing apparatus without a lock pin. With the fixing apparatus which has a lock pin, the central hole may be called as a lock pin inserting hole.

In a fixing apparatus according to a second embodiment of the present invention dependent on the first embodiment of the present invention, the groove is formed at a central portion of the body engagement hook in a width direction of the body engagement hook.

In a fixing apparatus according to a third embodiment of the present invention dependent on the first embodiment or the second embodiment of the present invention, a portion of the groove bottom surface including a center axis line-side end of the groove bottom surface is open toward an outside of the body head through the central hole, so that when the clip body is removed from the vehicle body, by inserting the tool into the central hole, the portion of the groove bottom surface including the center axis line-side end of the groove bottom surface can be pushed.

In a fixing apparatus according to a fourth embodiment of the present invention dependent on any one of the first to third embodiments of the present invention, the body engagement hook includes the outside surface and an inside surface located closer to the center axis line of the clip body than the outside surface, and the groove bottom surface extends from the outside surface of the body engagement hook to the inside surface of the body engagement hook.

In a fixing apparatus according to a fifth embodiment of the present invention dependent on any one of the first to fourth embodiments of the present invention, the clip body includes a back-up rib provided on a center axis line-side of the body engagement hook. A predetermined space is provided between the body engagement hook and the back-up rib in the direction perpendicular to the center axis line of the clip body. The predetermined space is set such that when the body engagement hook is displaced toward the center axis line of the clip body using the tool, the outside surface of the body engagement hook is located at a position equal to an outside surface of the body leg or closer to the center axis line of the clip body than the outside surface of the body leg.

In a fixing apparatus according to a sixth embodiment of the present invention dependent on any one of the first to fifth embodiments of the present invention, the fixing apparatus includes a lock pin, and the central hole is a lock pin inserting hole where the lock pin is inserted.

In a fixing apparatus according to a seventh embodiment of the present invention dependent on the sixth embodiment of the present invention, the body head of the clip body includes a side wall surrounding the lock pin inserting hole from a lateral side of the lock pin inserting hole. A temporary holding aperture for temporarily holding the lock pin when the lock pin is inserted into the lock pin inserting hole and a secure holding aperture located inner than the temporary holding aperture in the lock pin inserting direction, for securely holding the lock pin are both provided at the side wall. A pin head of the lock pin is surrounded by the side wall so that the pin head of the lock pin does not protrude from the clip body and is not exposed to a lateral side of the clip body when the lock pin engages the temporary holding aperture.

In a fixing apparatus according to an eighth embodiment of the present invention dependent on the sixth or seventh embodiment of the present invention, the lock pin includes:
a pin head;
a pin leg extending in a lock pin inserting direction from the pin head into the lock pin inserting hole;
a pin deformable portion extending from a pin leg connecting portion of the pin deformable portion toward the pin head and being elastically deformable about the pin leg connecting portion of the pin deformable portion in a direction perpendicular to an axial direction of the lock pin;
a pin engagement hook projecting from an outside surface of the pin deformable portion in a direction away from a center axis line of the lock pin; and
an extending portion extending from a portion of the pin deformable portion where the pin engagement hook is formed toward the pin head in the axial direction of the lock pin, the extending portion being pinched by a lock pin removing tool when the lock pin is removed.

In a fixing apparatus according to a ninth embodiment of the present invention dependent on any one of the first to eighth embodiments of the present invention, the fixing apparatus further comprises a spacer including a leg inserting aperture at a central portion of the spacer. The spacer is capable of fitting with the body leg at the leg inserting aperture. The spacer includes an elastically deformable portion elastically deformable in an axial direction of the clip body. The elastically deformable portion is formed from opposite spacer portions located closer to a center of the leg inserting aperture than opposite ends of the leg inserting aperture in a direction parallel to one direction of the spacer in a plan view of the spacer to opposite ends of the spacer in the one direction of the spacer in the plan view of the spacer.

A fixing apparatus removing structure according to a tenth embodiment of the present invention comprises the fixing apparatus according to any one of the first to eighth embodiments of the present invention, and the tool used for removing the fixing apparatus from the vehicle body.

The tool includes an inclined portion, provided at a tip of the tool in a tool inserting direction into the central hole, for pushing the groove bottom surface and displacing the body engagement hook toward the center axis line of the clip body when the tool is inserted into the central hole.

In a fixing apparatus removing structure according to an eleventh embodiment of the present invention dependent on the tenth embodiment of the present invention, the tool has a shape of a flat plate and the tool is manufactured by punching a flat plate material using a stamping machine.

In a fixing apparatus removing structure according to a twelfth embodiment of the present invention dependent on the tenth embodiment or the eleventh embodiment of the present invention, the tool includes a forked portion provided at the tip of the tool in the tool inserting direction into the central hole, and the inclined portion is formed at a tip of the forked portion in the tool inserting direction into the central hole. The inclined portion of the tool inclinedly extends in a direction from an outside surface of the forked portion toward a center of the forked portion in the width direction of the forked portion and in a direction opposite the tool inserting direction into the central hole.

In a fixing apparatus removing structure according to a thirteenth embodiment of the present invention dependent on any one of the tenth to twelfth present embodiments of the present invention, the groove bottom surface of the body engagement hook has a concave surface which is concave in a direction toward the body head in a cross section perpendicular to a longitudinal direction of the groove, and the inclined portion of the tool has a convex surface which is convex relative to the groove bottom surface in a cross section perpendicular to a longitudinal direction of the inclined portion.

In a fixing apparatus removing structure according to a fourteenth embodiment of the present invention dependent on any one of the tenth to thirteenth embodiments of the present invention, the tool has a protrusion which protrudes toward an inside surface of the central hole at a tool surface facing the inside surface of the central hole when the tool is inserted into the central hole. The protrusion has such a height in a direction perpendicular to the center axis line of the clip body as causes the protrusion to interfere with the inside surface of the central hole or causes the protrusion to enter a temporary holding aperture or a secure holding aperture formed at a wall of the central hole.

A curtain airbag fixing apparatus according to a fifteenth embodiment of the present invention is an apparatus for fixing a curtain airbag to a vehicle body using the fixing apparatus according to any one of the first to ninth embodiments of the present invention or a fixing apparatus used in the fixing apparatus removing structure according to any one of the tenth to fourteenth embodiments of the present invention.

A curtain airbag fixing apparatus according to a sixteenth embodiment of the present invention is an apparatus for fixing a curtain airbag to a vehicle body using a fixing apparatus used in the fixing apparatus removing structure according to any one of the tenth to fourteenth embodiments of the present invention. When the fixing apparatus is removed from the clip body, the tool is inserted into the central hole whereby the body engagement hook is caused to recede toward the center axis line of the clip body and to engage the clip body, and when the tool is extracted, the clip body is removed from the vehicle body.

A curtain airbag fixing apparatus according to a seventeenth embodiment of the present invention is an apparatus for fixing a curtain airbag to a vehicle body using the fixing apparatus according to the eighth embodiment of the present invention. When the lock pin is removed from the clip body, the lock pin removing tool is inserted into the lock pin inserting hole and pinch the extending portion of the lock pin whereby the pin engagement hook is displaced toward the center axis line of the lock pin, and when the lock pin removing tool is extracted, the lock pin is removed from the clip body.

Technical Advantages

According to the fixing apparatus of the first embodiment of the present invention, because the groove is formed at the body engagement hook and the groove has a groove bottom surface which inclinedly extends from an outside surface of the body engagement hook toward the body head and the center axis line of the clip body, the body engagement hook can be displaced toward the center axis line of the clip body by pushing the groove bottom surface by the tool, whereby the fixing apparatus can be brought to a state that the fixing apparatus is removable from the vehicle body.
This technical advantage can be obtained in both of a fixing apparatus which has a lock pin and a fixing apparatus which does not have a lock pin.

According to the fixing apparatus of the second embodiment of the present invention, because the groove is formed at the central portion of the body engagement hook in the width direction of the body engagement hook, shoulders remain at opposite sides of the groove in the width direction of the body engagement hook so that an engagement strength of the engagement hook with the vehicle body is almost not decreased despite that the groove is provided.

According to the fixing apparatus of the third embodiment of the present invention, because the portion of the groove bottom surface including the center axis line-side end of the groove bottom surface is open toward a body head-side opening of the central hole, when the tool is inserted through the central hole, the groove bottom surface can be pushed by the tool.

According to the fixing apparatus of the fourth embodiment of the present invention, because the groove bottom surface extends from the outside surface of the body engagement hook to the inside surface of the body engagement hook, the center axis line-side end of the groove bottom surface can be located at a position which is visible through the central hole from the opening of the central hole in the plan view of the fixing apparatus. Further, when the tool is inserted through the central hole, the groove bottom surface can be pushed by the tool.

According to the fixing apparatus of the fifth embodiment of the present invention, because the predetermined space is provided between the body engagement hook and the back-up rib in the direction perpendicular to the center axis line of the clip body, the body engagement hook can be displaced until the outside surface of the body engagement hook comes to the outside surface of the body leg or a position closer to the center axis line of the body clip than the outside surface of the body leg.

According to the fixing apparatus of the sixth embodiment of the present invention, because the fixing apparatus is provided with the lock pin and the central hole is a lock pin inserting hole into which the lock pin is inserted, the technical advantages of the fixing apparatus of the first to fifth embodiments of the present invention can be obtained at the fixing apparatus provided with the lock pin.

According to the fixing apparatus of the seventh embodiment of present the invention, because the pin head of the lock pin is surrounded by the side wall so that the pin head of the lock pin does not protrude upward from the clip body and is not exposed to a lateral side of the clip body when the lock pin engages the temporary holding aperture, the lock pin can be prevented from being erroneously inserted from the temporary holding aperture to the secure holding aperture.

According to the fixing apparatus of the eighth embodiment of the present invention, because the lock pin includes the extending portion, when removing the lock pin from the clip body, by inserting the lock pin removing tool into the lock pin inserting hole and pinching the extending portion with the tool, the extending portion and the pin engagement hook can be displaced toward the center axis line of the lock pin so that the pin engagement hook can be disengaged from the holding aperture. Then, by extracting the tool while the extending portion is pinched by the tool, the lock pin can be taken out from the clip body. Since the removal of the lock pin is conducted by a series of operations including inserting the tool, pinching the extending portion by the tool, and extracting of the tool, the removal of the lock pin is easy.

According to the fixing apparatus of the ninth embodiment of the present invention, because the elastically deformable portion is formed from opposite spacer portions located closer to a center of the leg inserting aperture than opposite ends of the leg inserting aperture in a direction parallel to one direction of the spacer in a plan view of the spacer to opposite ends of the spacer in the one direction of the spacer in the plan view of the spacer, a range where the spacer is deformable is enlarged and is long. Due to the structure, a deformation amount of the spacer in an axial direction of the clip body relative to a reference insertion load of the fixing apparatus into the fixing apparatus mounting aperture of the vehicle body is increased. As a result, the fixing apparatus can absorb fluctuations in a distance (a length of a neck below the head) between the body head of the clip body and the vehicle body and can be used for a fixing apparatus having a long neck length. Further, without selectively using the spacers, clearances between the fixing apparatus and members to be mounted, for example, the tab of the CSA and the spacer, etc., can be absorbed so that rotational plays of the members to be mounted can be suppressed and appropriate inserting loads can be obtained.

According to the fixing apparatus removing structure of the tenth embodiment of the present invention, because the tool includes the inclined portion provided at the tip of the tool in the tool inserting direction into the central hole, when the tool is inserted into the central hole and the inclined portion of the tool pushes the groove bottom surface at a time of removing the fixing apparatus, a force toward the center axis line of the clip body is generated and displaces the body engagement hook toward the center axis line of the clip body. As a result, the fixing apparatus is removable from the vehicle body.

According to the fixing apparatus removing structure of the eleventh embodiment of the present invention, because the tool has a shape of a flat plate and the tool is manufactured by punching a flat plate material using a stamping machine, the tool can be manufactured easily and at a low cost.

According to the fixing apparatus removing structure of the twelfth embodiment of the present invention, because the tool includes the forked portion and the inclined portion of the tool inclinedly extends from the outside surface of the forked portion toward the center of the forked portion in the width direction of the forked portion and to extend in the direction opposite the tool inserting direction into the central hole, it is possible to displace the body engagement hook toward the center axis line of the clip body by pushing the tool in the tool inserting direction.

According to the fixing apparatus removing structure of the thirteenth embodiment of the present invention, because the groove bottom surface of the body engagement hook has the concave surface and the inclined portion of the tool has the convex surface in the cross section perpendicular to the longitudinal direction of the inclined portion, when the tool is pushed in the tool inserting direction and is caused to slide relative to the engagement hook, the tool will not stick to the groove bottom surface and will not be slidable.

According to the fixing apparatus removing structure of the fourteenth embodiment of the present invention, because the protrusion has such a height as causes the protrusion to interfere with the inside surface of the central hole surrounding wall or causes the protrusion to enter the temporary holding aperture or the secure holding aperture, when removing the fixing apparatus, the fixing apparatus can be extracted from the vehicle body together with the tool by only pulling the tool, due to the abrasion between the protrusion and the inside surface of the central hole surrounding wall or the engagement of the protrusion with the temporary holding aperture or the secure holding aperture.

According to the CSA fixing apparatus of the fifteenth embodiment of the present invention, the same technical advantages as those of the fixing apparatus or the fixing apparatus removing structure of the first to fourteenth embodiments of the present invention are obtained.

According to the CSA fixing apparatus of the sixteenth embodiment of the present invention, the fixing apparatus can be extracted from the vehicle body by only a series of operations including pushing and pulling the tool. As a result, removal of the fixing apparatus is easy. Further, the body engagement hook of the clip body is prevented from being damaged. Therefore, it becomes possible to use the fixing apparatus again.

According to the CSA fixing apparatus of the seventeenth embodiment of the present invention, the lock pin can be removed by only inserting the tool, pinching the extending portion by the tool, and extracting the tool. As a result, removal of the lock pin is easy. Therefore, it becomes possible to use the fixing apparatus again.

DETAILED DESCRIPTION

Figure 1:
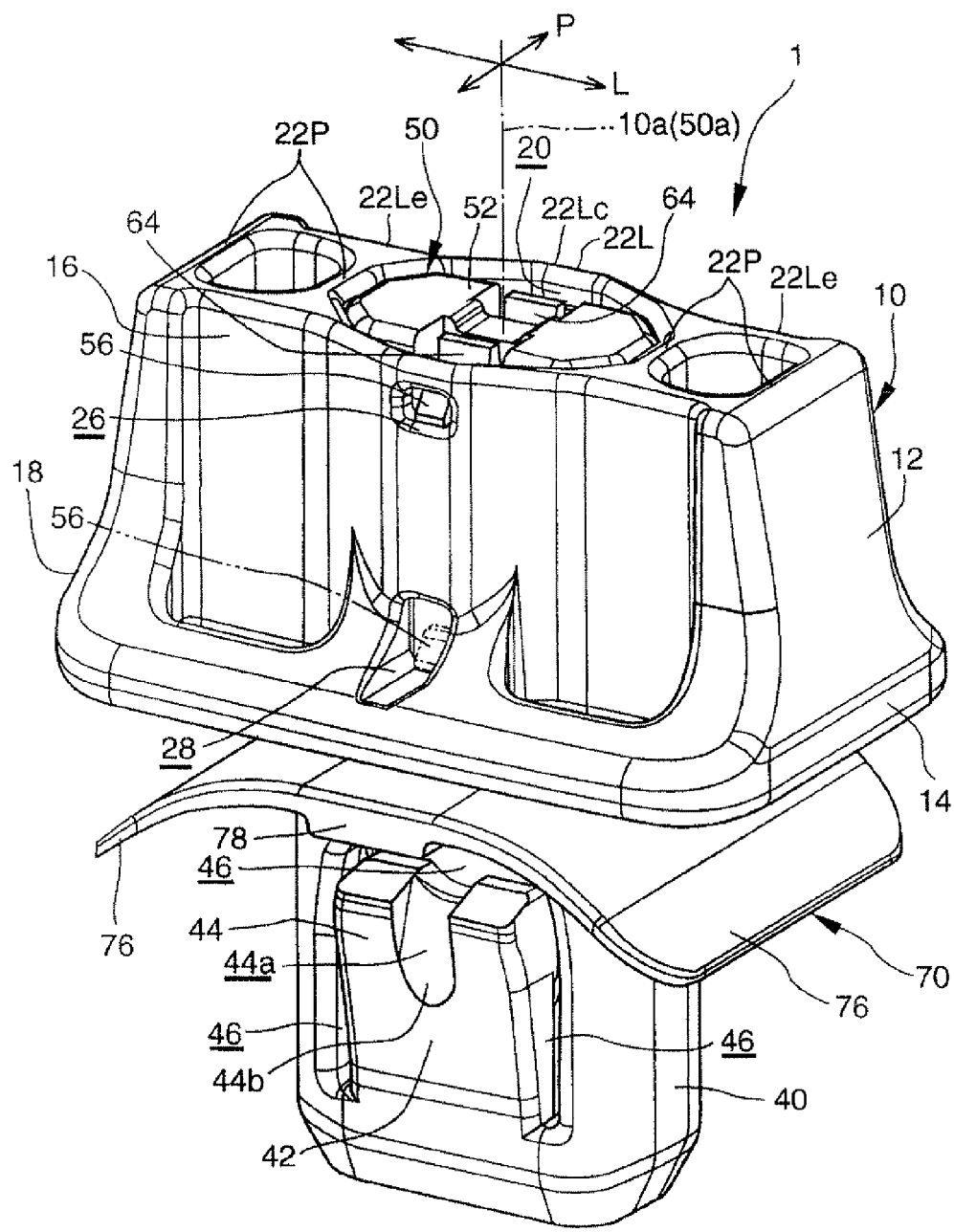
FIG. 1 is a perspective view of a fixing apparatus according to an embodiment of the present invention.

A fixing apparatus according to an embodiment of the present invention, a fixing apparatus removing structure for removing the fixing apparatus from a vehicle body and a CSA fixing apparatus for fixing a CSA to the vehicle body using the fixing apparatus will be explained with reference to FIGS. 1-21.

In some of FIGS. 1-21, "L" shows a longitudinal direction of the fixing apparatus having a rectangular shape in a plan view of the fixing apparatus, and "P" shows a direction perpendicular to the longitudinal direction. Further, in FIG. 20, "FR" shows a front direction of a vehicle, and "UP" shows an up direction of the vehicle. In FIG. 21, "IN" shows an inward direction in a right-left direction of the vehicle.

Structures of the fixing apparatus 1, the fixing apparatus removing structure 5 and the CSA fixing apparatus 2 will be explained in this order.

In the explanation of the fixing apparatus 1, a clip body 10, a lock pin 50 and a spacer 70 will be explained in this order.

In the explanation of the clip body 10, a structure of the clip body 10 and an engagement structure of the clip body 10 with the vehicle body 90 will be explained in this order. A structure for removing the clip body 10 from the vehicle body 90 will be explained in a fixing apparatus removing structure 5.

In the explanation of the lock pin 50, a structure of the lock pin 50, an engagement structure of the lock pin 50 with the clip body 10 and a structure for removing the lock pin 50 from the clip body 10 will be explained in this order.

In the explanation of the fixing apparatus removing structure 5, a structure for removing the clip body 10 from the vehicle body 90 and a tool 4 used for removing the clip body 10 from the vehicle body 90 will be explained in this order.

In the CSA fixing apparatus 2, an apparatus for fixing the CSA 80 to the vehicle body 90 using the fixing apparatus 1 will be explained.

[Fixing Apparatus]
[Clip Body of the Fixing Apparatus]

As illustrated in FIGS. 1-3 and FIGS. 7-9, the fixing apparatus 1 includes the clip body 10. The fixing apparatus 1 may further include the lock pin 50 and the spacer 70. However, the fixing apparatus may not have the lock pin 50.

The clip body 10 includes a center axis line 10a of the clip body. The center axis line 10a may be called as an axis. The clip body 10 includes, at a central portion, a central hole 20 which extends along the center axis line 10a of the clip body. In the fixing apparatus having the lock pin 50, the central hole may be called as a lock pin inserting hole. A reference numeral for the central hole and a reference numeral for the lock pin inserting hole are "20", respectively.

Hereinafter, explanation will be made taking the fixing apparatus having the lock pin 50 as an example.

The clip body 10 is made from synthetic resin having a particular elasticity. The lock pin 50 and the spacer 70 also are made from synthetic resin having a particular elasticity. The synthetic resin is, for example, polyacetal or polyhexamethylene adipamide. However, an other synthetic resin having an elasticity and a required strength may be used.

As illustrated in FIG. 1, the clip body 10 includes a body head 12 and a body leg 40 that each extend along the center axis line 10a of the clip body. The body head 12 and the body leg 40 may have a configuration of a rectangle in a plane perpendicular to the center axis line 10a of the clip body. The rectangle may be rounded at corners, and may be curved or polygonally shaped at sides.

As illustrated in FIG. 21, in a state that the CSA 80 is mounted to the body 90 at the fixing apparatus mounting aperture 90d, in a plan view of the body head 12 viewed along the center axis line 10a of the clip body, a direction in which a long side of the configuration of a rectangle extends and a direction in which a main portion 80a of the CSA extends are parallel to each other.

The body head 12 of the clip body 10 includes a flange 14 extending in a direction perpendicular to the center axis line 10a of the clip body, a reduced width portion 16 located at a body leg-opposite side of the flange 14 in a direction in which the center axis line 10a of the clip body extends, and a connecting portion 18 connecting the reduced width portion 16 and the flange 14. A width of the reduced width portion 16 is narrower than a width of the flange 14 in a direction "P" perpendicular to a longitudinal direction "L" of the CSA. As a result, as illustrated in FIG. 21, a configuration of a cross section of the CSA 80 can approach the center axis line 10a of the clip body, so that a width of the A-pillar garnish 98 can be made small. A width of the connecting portion 18 in the direction "P" perpendicular to the longitudinal direction of the CSA is increased along a direction from the reduced width portion 16 toward the flange 14.

Figure 2:
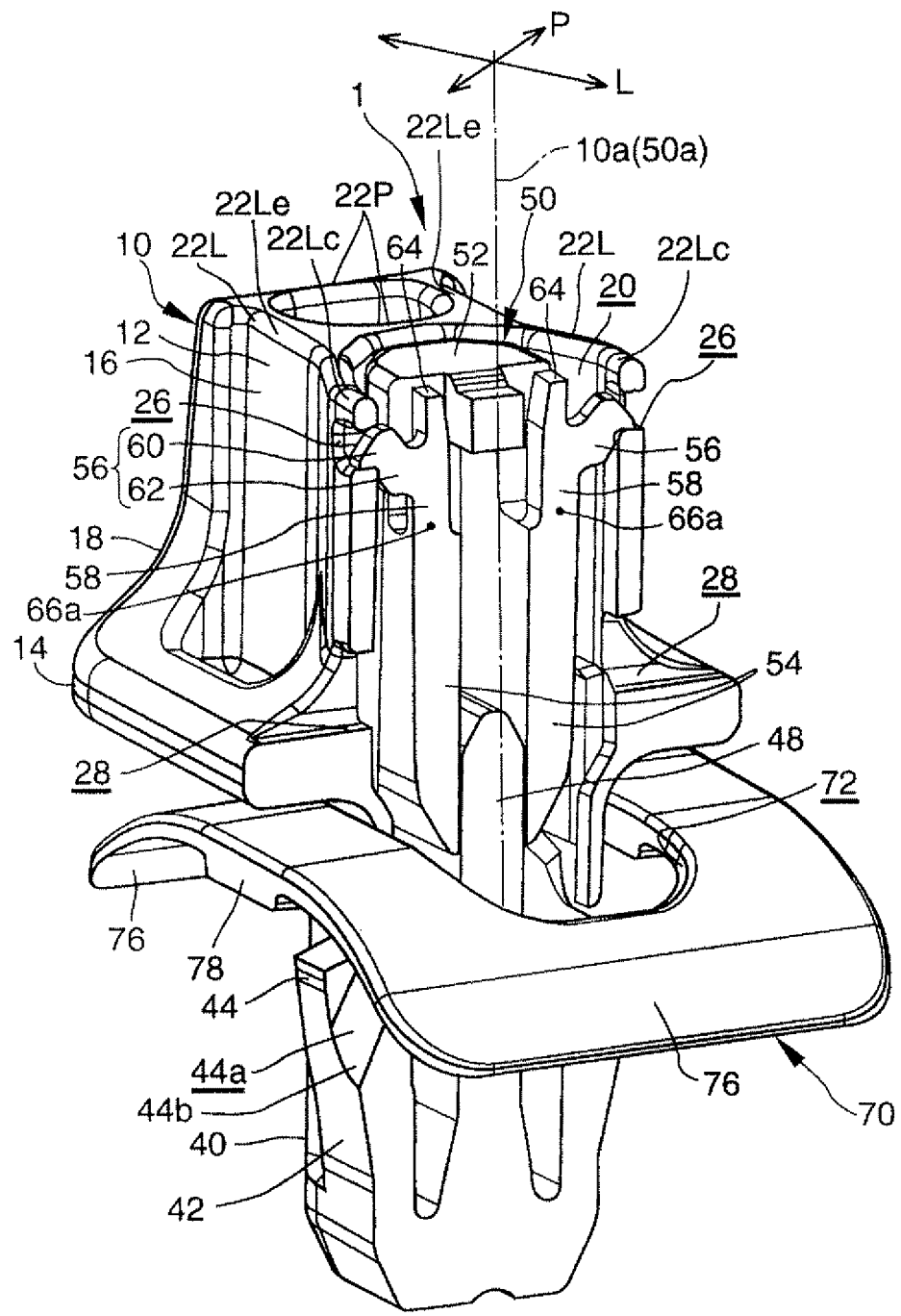
FIG. 2 is a perspective view of the fixing apparatus of FIG. 1, an upper portion of which is shown in a fragmentary cross section, in a state that a pin engagement hook of a lock pin engages a temporary holding aperture of a clip body.
Figure 3:
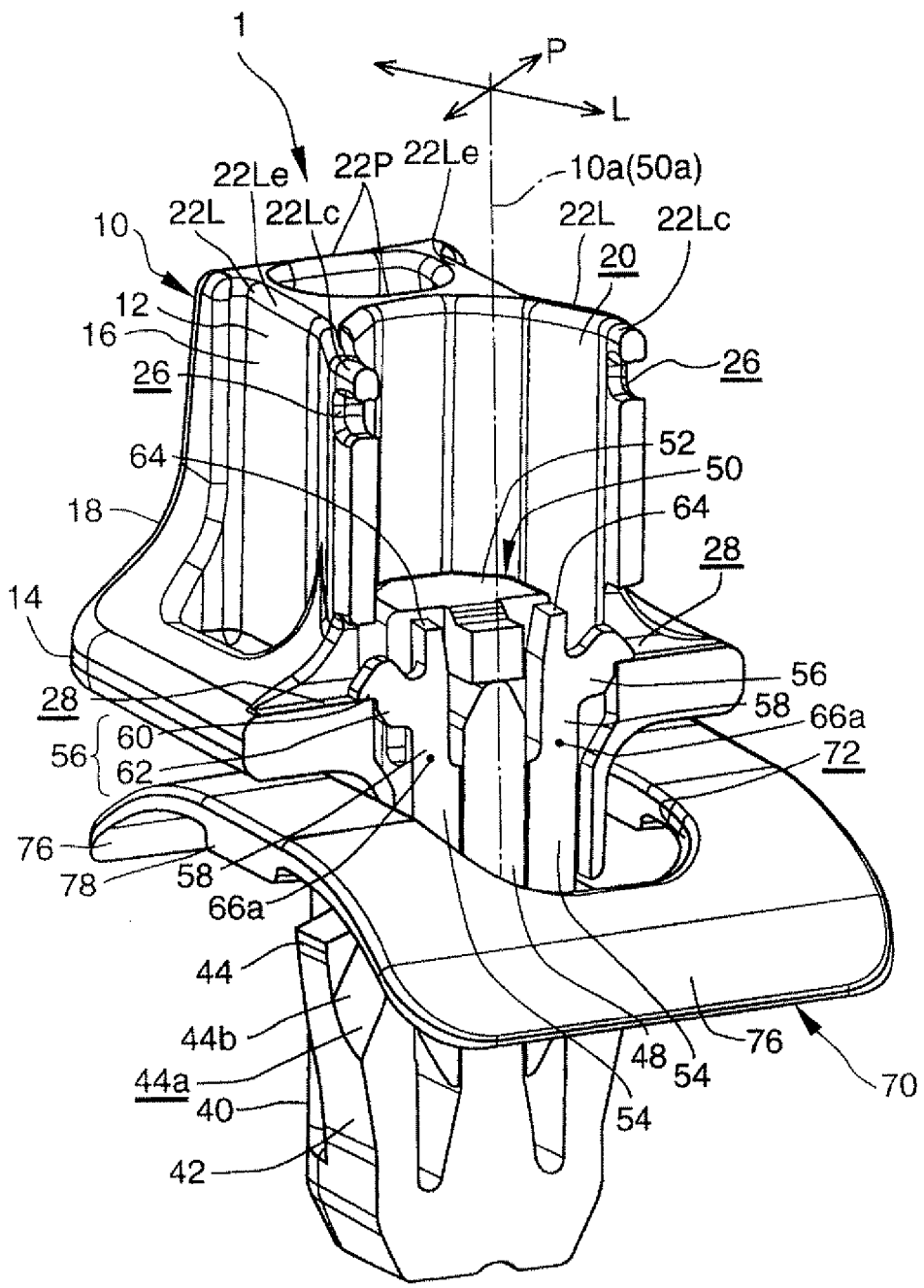
FIG. 3 is a perspective view of the fixing apparatus of FIG. 1, an upper portion of which is shown in a fragmentary cross section, in a state that the pin engagement hook of the lock pin engages a secure holding aperture of the clip body.
Figure 7:
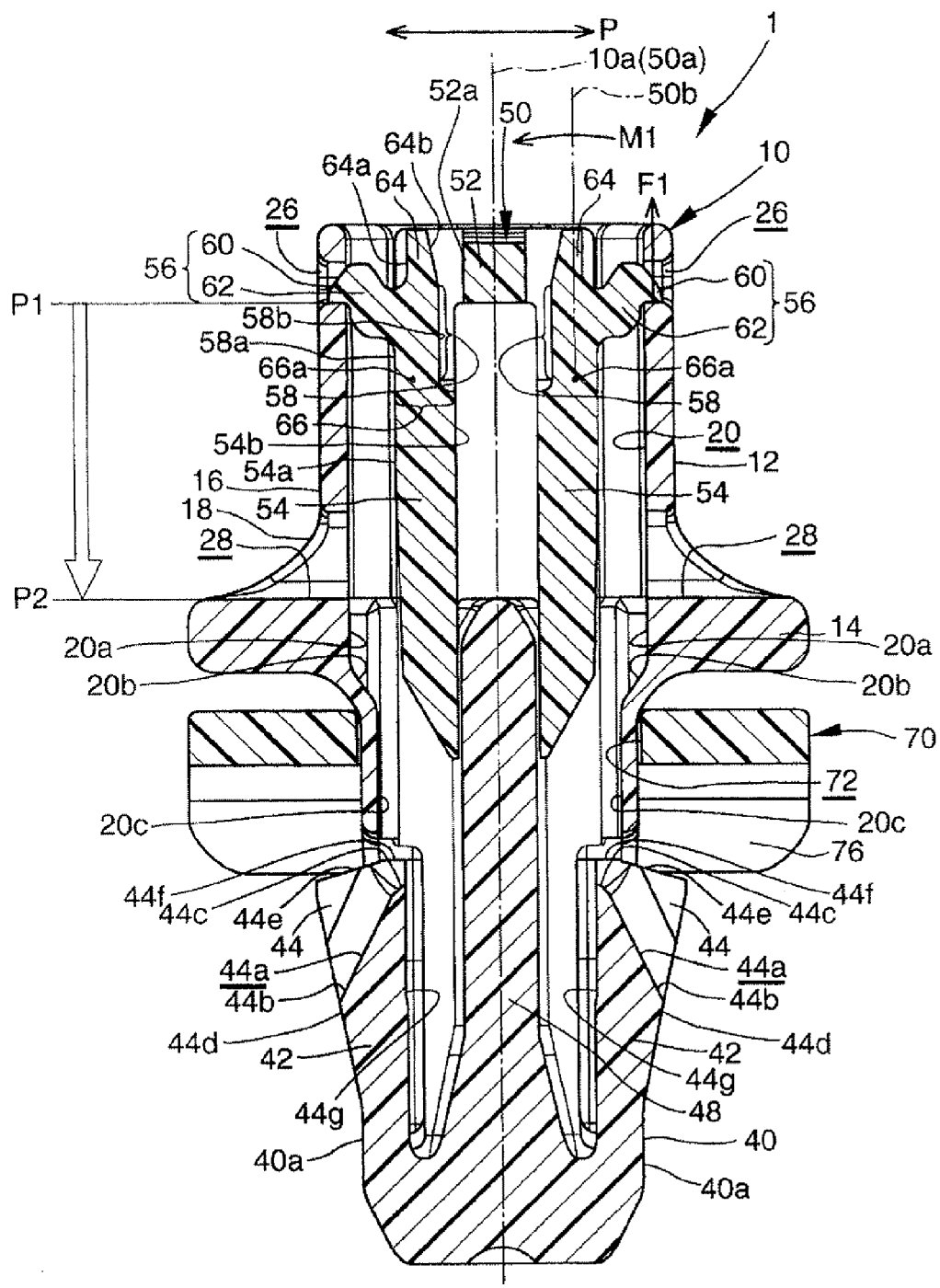
FIG. 7 is an enlarged cross-sectional view of the fixing apparatus of FIG. 1 in the state that the pin engagement hook of the lock pin engages the temporary holding aperture of the clip body.
Figure 8:
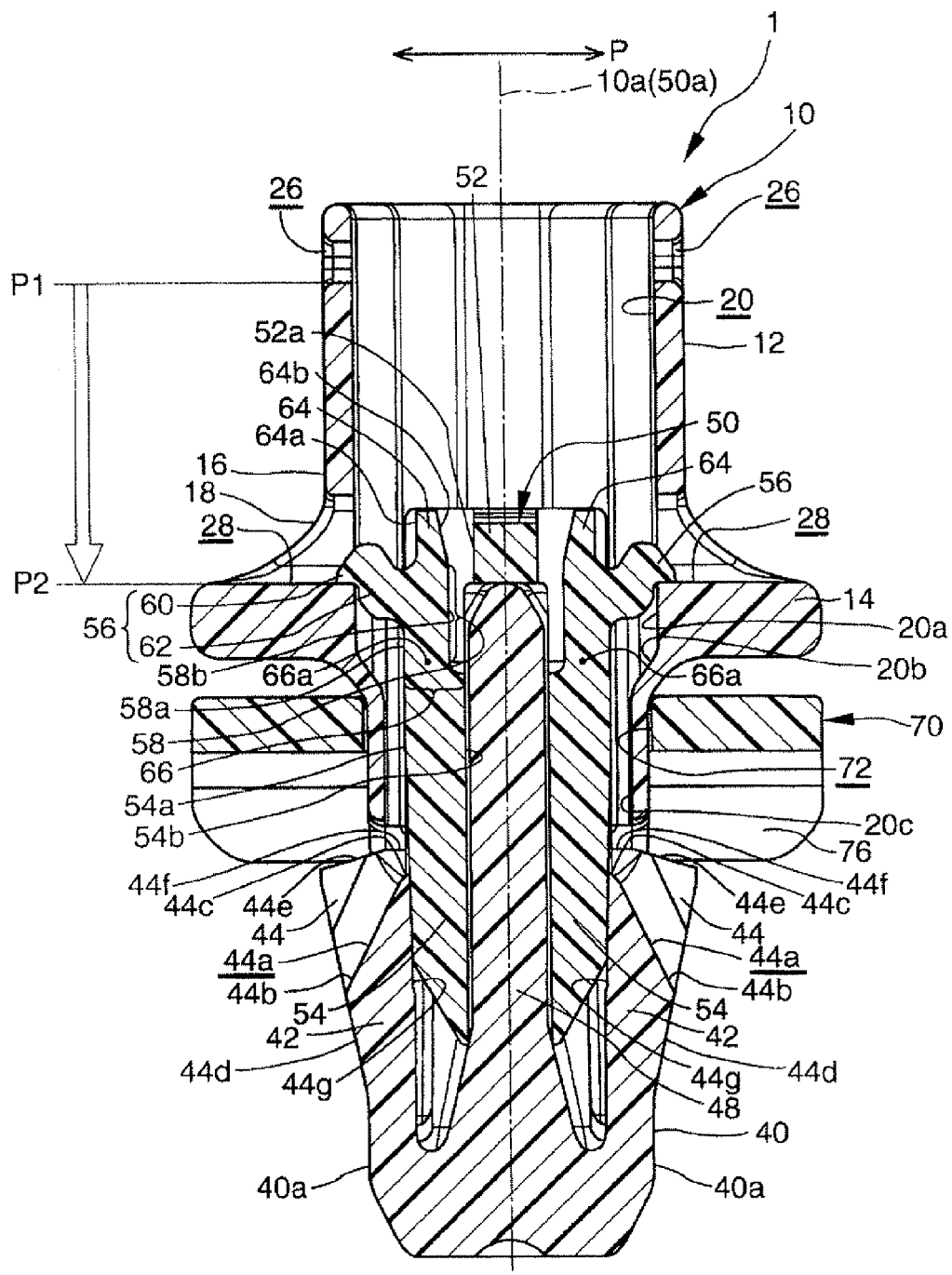
FIG. 8 is an enlarged cross-sectional view of the fixing apparatus of FIG. 1 in the state that the pin engagement hook of the lock pin engages the secure holding aperture of the clip body.
Figure 9:
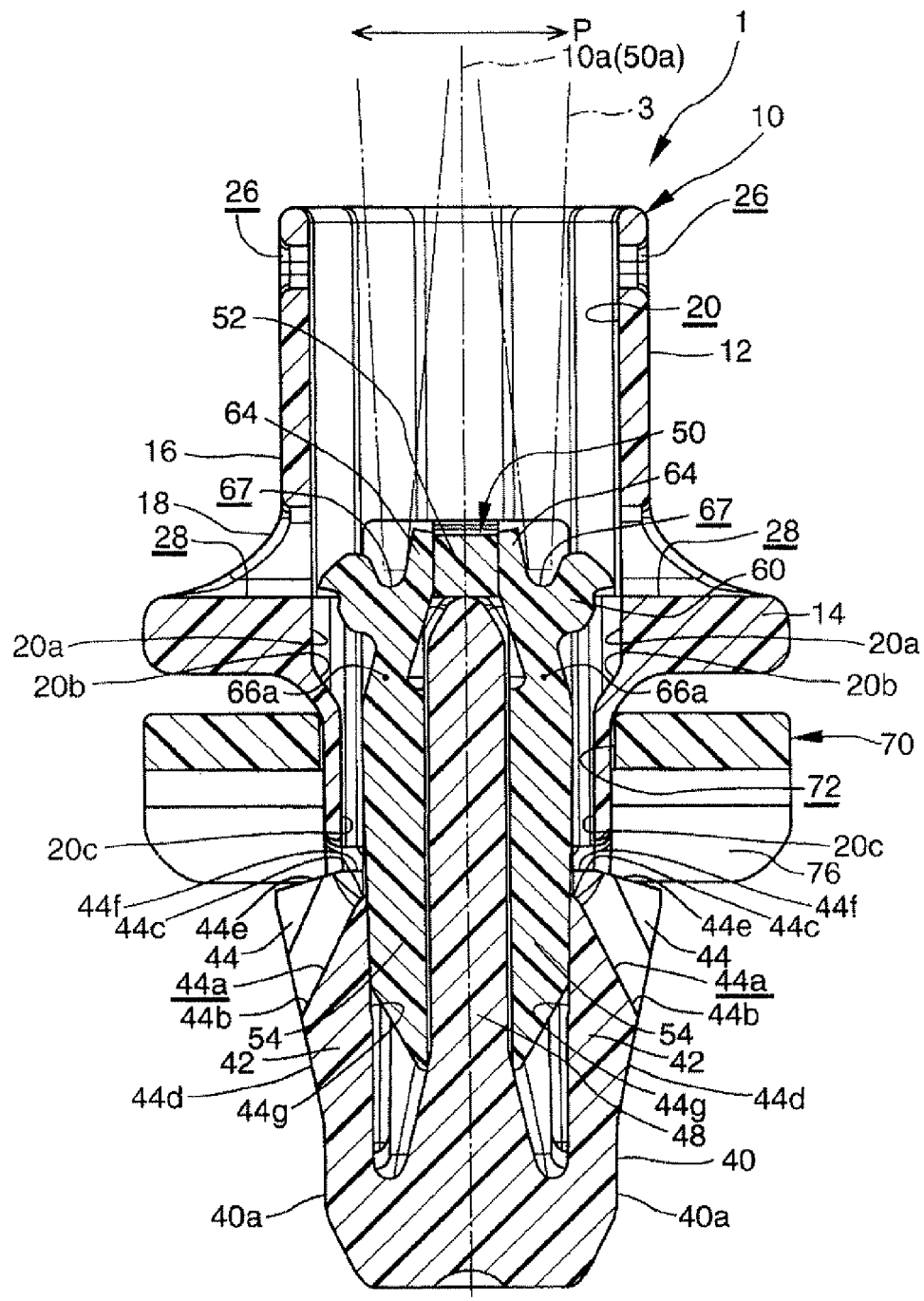
FIG. 9 is a cross-sectional view of the fixing apparatus of FIG. 8 in a state that an extending portion of the lock pin is pinched by a tool and is disengaged from the secure holding aperture of the clip body.

As illustrated in FIGS. 1-3, a center axis line of the lock pin inserting hole 20 provided at the central portion of the clip body 10 coincides with the center axis line 10a of the clip body. The lock pin inserting hole 20 is open on the side opposite the body leg 40 along the center axis line of the lock pin inserting hole 20. As illustrated in FIGS. 7-9, the lock pin inserting hole 20 extends from an upper end of the body head 12 to a bottom wall formed at a vicinity of a lower end of the body leg 40. The lock pin 50 is inserted into the lock pin inserting hole 20 from the opening of the lock pin inserting hole 20.

In the lock pin inserting hole 20, a back-up rib 48 is provided. The back-up rib supports a pin leg 54 from the opposite side of the body engagement hook 44 when the lock pin 50 is inserted into the lock pin inserting hole 20. The back-up rib 48 may be called as a central rib, because the back-up rib is provided at a center of the lock pin inserting hole 20. The back-up rib 48 extends from a height position corresponding to about an upper surface of the flange 14 to the bottom wall formed at the vicinity of a lower end of the body leg 40. There is provided a space between the back-up rib 48 and an inside surface of the body leg 40 which is hollow, and the pin leg 54 of the lock pin 50 enters the space.

As illustrated in FIGS. 1-3, the body head 12 includes a pair of side walls 22L and at least one pair (two pairs in the embodiment shown) of perpendicular side walls (hereinafter, simply side walls) 22P. The side wall 22L extends along the longitudinal direction "L" of the CSA at opposite ends of the lock pin inserting hole 20 in the direction "P" perpendicular to the longitudinal direction of the CSA. The side wall 22P extends in the direction "P" perpendicular to the longitudinal direction of the CSA on opposite sides of the lock pin inserting hole 20 in the longitudinal direction "L" of the CSA. The side wall 22L rises from the flange 14 in the direction opposite the body leg 40 and extends to a tip of the body head 12 in a direction parallel to the center axis line 10a of the clip body. The side wall 22P rises from the flange 14 in the direction opposite the body leg 40 and extends to the tip of the body head 12 in the direction parallel to the center axis line 10a of the clip body.

The lock pin inserting hole 20 is covered by the pair of side walls 22L in the direction "P" perpendicular to the longitudinal direction of the CSA. The lock pin inserting hole 20 is covered also by the pair of side walls 22P in the longitudinal direction of the CSA. As a result, the lock pin inserting hole 20 is surrounded by the pair of side walls 22L and the pair of side walls 22P, more particularly with the inner pair of side walls 22P in the case where two pairs of side walls are provided, in the longitudinal direction of the CSA.

A space between the pair of side walls 22L in the direction "P" perpendicular to the longitudinal direction of the CSA is made larger at a central portion 22Lc in the longitudinal direction of the CSA than at an end portion 22Le in the longitudinal direction of the CSA. The central portions 22Lc of the pair of side walls 22L protrudes in a direction away from the center axis line 10a so as to form a shape of a curve or a part of a polygon.

The space between inside surfaces of the central portions 22Lc of the pair of side walls 22L and a space between inside surfaces of the pair of side walls 22P are set such that a finger does not enter or is unlikely to enter the lock pin inserting hole. As a result, when the lock pin 50 is positioned at a temporary holding position, the lock pin 50 is prevented from being erroneously pushed to an inner position by a finger.

When an pin engagement hook 56 enters a temporary holding aperture 26 and the lock pin 50 is positioned at the temporary holding position P1, an entirety of the lock pin 59 is positioned in the lock pin inserting hole 20. In this state, an upper surface of a pin head 52 of the lock pin 50 does not protrude from the tip, on the side further from the body leg 40, of the body head 12 in a direction away from the body leg 40. Due to this structure also, the lock pin 50 is prevented from being erroneously inserted to an inner position.

Further, it is desirable to set a load for inserting the lock pin 50 to a secure holding position at a higher load than a load for inserting the clip body 10 to the vehicle body 90 which will be post-described.

[Engaging Structure of the Clip Body with the Vehicle Body]

As illustrated in FIGS. 1-3 and FIGS. 13-15, the body leg 40 of the clip body 10 extends from the flange 14 in a direction opposite the body head 40 along the center axis line 10a of the clip body. At a side wall of the body leg 40, a body engagement hook 44 which is elastically deformable in a direction perpendicular to the side wall of the body leg is provided.

The engagement hook 44 may be provided at each of the pair of side walls L extending along the longitudinal direction of the CSA, i.e., two engagement hooks 44 may be provided, or the engagement hook 44 may be provided at each of four side walls, i.e., four engagement hooks 44 may be provided. Drawings show a case where two engagement hooks 44 are provided.

The body engagement hook 44 is separated by a slit 46 from the side wall of the body leg 40 at three sides of the body engagement hook including opposite sides of the body engagement hook 44 and a body head-side of the body engagement hook 44. The body engagement hook 44 is connected to the side wall of the body leg 40 at a body head opposite-side end of the body engagement hook 44. A portion of the body engagement hook 44 adjacent to a root of the body engagement hook 44 is thinner in thickness than a body head-side end of the body engagement hook so as to be deformable about the root in the direction perpendicular to the center axis line 10a of the clip body, and acts as a body deformable portion 42 for causing the body engagement hook 44 to be elastically deformed in the direction perpendicular to the center axis line 10a of the clip body. The body deformable portion 42 constructs a portion of the body engagement hook 44. The body engagement hook 44 includes an outer portion which is formed at a body head-side end portion and is bulged in the direction perpendicular to the center axis line 10a of the clip body and in a direction away from the center axis line 10a of the clip body. The outer portion of the body engagement hook 44 protrudes more than an outside surface 40a of a portion of the body leg 40 except the body engagement hook 44 in the direction perpendicular to the center axis line 10a of the clip body in a free state of the body engagement hook 44.

As illustrated in FIGS. 8 and 9, the body engagement hook 44 includes an outside surface 44d which obliquely extends from an outside surface of the root of the body engagement hook 44 in a direction toward the body head 12 and away from the center axis line 10a of the clip body, an upper surface 44e which obliquely extends from a body head-side end of the outside surface 44d in a direction toward the body head 12 and toward the center axis line 10a of the clip body, and another upper surface 44f which is bent at a halfway position of the surface 44e and extends substantially perpendicular to the center axis line 10a of the clip body in a direction toward the center axis line 10a of the clip body up to an inside surface 44g of the body engagement hook 44.

The inside surface 44g of the body engagement hook 44 extends substantially parallel to the center axis line 10a of the clip body. A space is provided between the inside surface 44g of the body engagement hook 44 and the back-up rib 48. When the pin leg 54 of the lock pin 50 is not yet inserted into the space, the body engagement hook 44 can be elastically displaced toward the center axis line 10a of the clip body. When the pin leg 54 of the lock pin 50 has been inserted into the space, the body engagement hook 44 can not be elastically displaced toward the center axis line 10a of the clip body. At a state that the lock pin 50 is not yet inserted into the space, the clip body 10 is pushed into the clip body mounting aperture 90d of the vehicle body 90. When the body engagement hook 44 passes through the clip body mounting aperture 90d, the body engagement hook 44 recedes toward the center axis line 10a of the clip body. When the body engagement hook 44 has passed through the clip body mounting aperture 90d, the body engagement hook 44 returns to an original position due to an elasticity of the hook, so that the upper end 44e of the body engagement hook 44 engages the clip body mounting aperture-defining edge of the vehicle body. At this state, when the lock pin 50 is inserted into the space, the clip body 10 is locked with the vehicle body 90 so that the clip body 10 can not be removed from the vehicle body.

When the clip 10 is required to be removed from the fixing apparatus mounting aperture 90d-defining edge of the body 90 such as at a time of maintenance, in a case of a fixing apparatus 1 having a lock pin 50, at first the lock pin 50 is removed from the clip body 10 using a lock pin removing tool 3. Then, using a clip body removing tool 4, the body engagement hook 44 is caused to recede toward the center axis line 10a of the clip body.

At the state, the clip body 10 is extracted from the fixing apparatus mounting aperture 90d-defining edge of the body. In a case of a fixing apparatus not having a lock pin 50, the tool 4 is inserted into the central hole 20, and the body engagement hook 44 is caused to recede toward the center axis line 10a of the clip body. At the state, the clip body 10 is extracted from the fixing apparatus mounting aperture 90d-defining edge of the body.

Details of the structure for removing the lock pin 50 using the lock pin removing tool 3 and details of the structure for removing the clip body 10 from the vehicle body 90 using the clip body removing tool 4 will be later described.

[Lock Pin of the Fixing Apparatus]

As illustrated in FIGS. 1-3, the lock pin 50 includes an axial center line 50a of the lock pin. The center axis line may be called as an axis. The lock pin 50 is inserted into the lock pin inserting hole 20 with the axial center line 50a of the lock pin coincident with the center axis line 10a of the clip body.

As illustrated in FIG. 7, when the lock pin 50 is inserted to a halfway position of the lock pin inserting hole 20 and is positioned at the temporary holding position P1, the lock pin 50 is temporarily held at the clip body 10.

As illustrated in FIG. 8, when the lock pin 50 is inserted to an innermost position of the lock pin inserting hole 20 and is positioned at the secure holding position P2, the lock pin 50 is securely held at the clip body 10.

Figure 4:
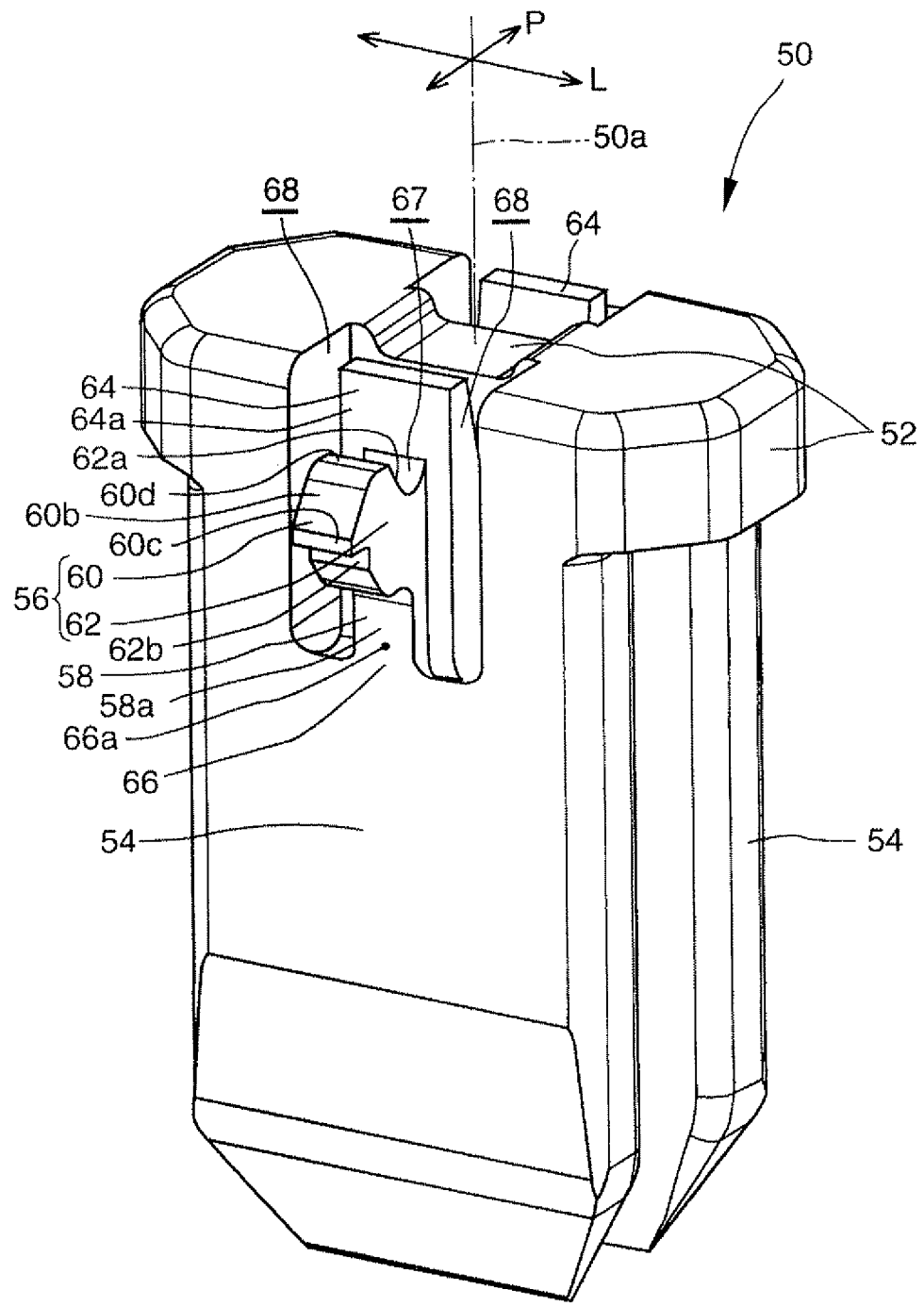
FIG. 4 is an enlarged, perspective cross-sectional view of the lock pin of the fixing apparatus of FIG. 1.
Figure 5:
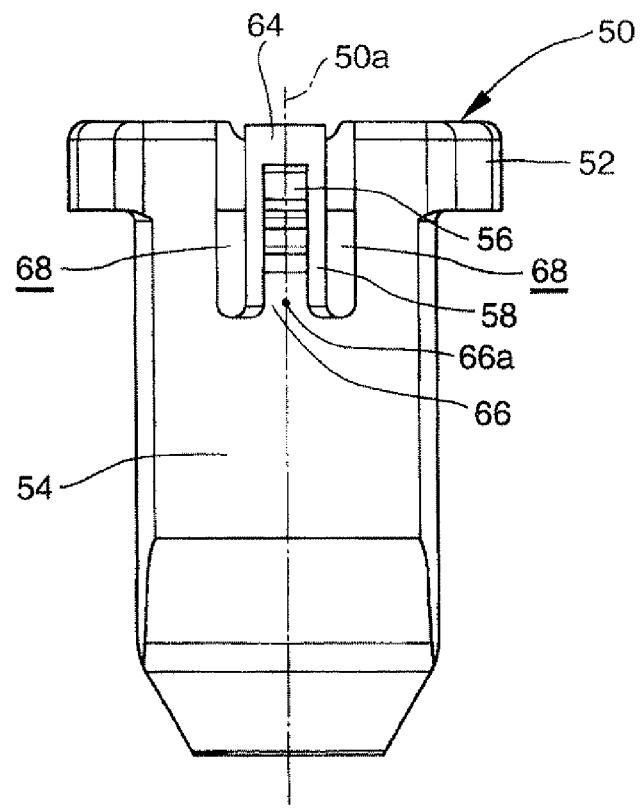
FIG. 5 is a front elevational view of the lock pin of the fixing apparatus of FIG. 1.
Figure 6:
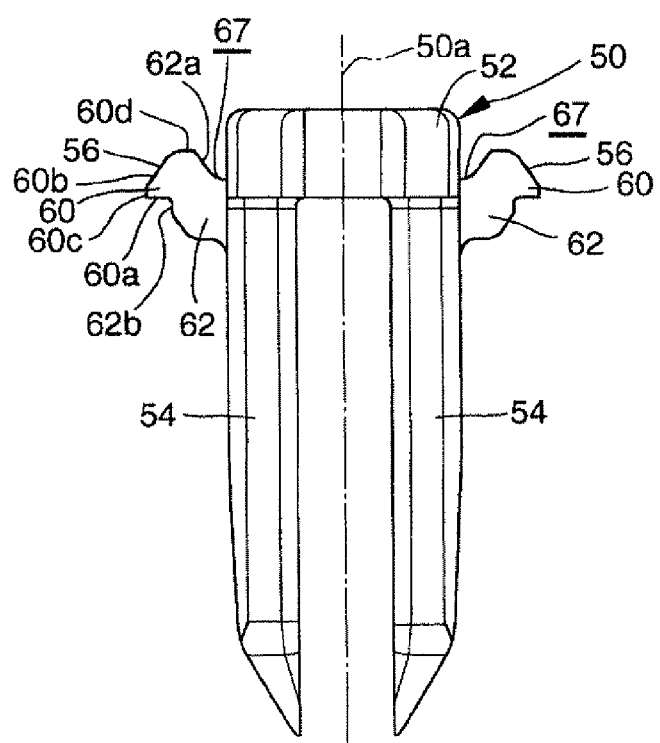
FIG. 6 is a side elevational view of the lock pin of the fixing apparatus of FIG. 1.

As illustrated in FIGS. 4-6, the lock pin 50 includes the pin head 52, the pin leg 54, the pin engagement hook 56, a pin deformable portion 58 and an extending portion 64. The extending portion 64 will be post-described at a lock pin removing structure.

A shape of the pin head 52 in a plan view when viewed along the center axis line 50*a* of the lock pin is a rectangle. This rectangle may include a rectangle having corners cut and long sides having central portions caused to recede toward the center axis line 50*a* of the lock pin.

As illustrated in FIG. 21, in a state that the CSA 80 is coupled to the vehicle body 90 using the fixing apparatus 1 and the lock pin 50 is temporarily or securely held at the clip body 10, a direction in which the long side of the rectangle of the lock pin 50 extends and a direction in which a main body 80*a* of the CSA extends are parallel to each other.

The pin leg 54 extends from the pin head 52 in a lock pin inserting direction into the clip body 10 and in a direction parallel to the center axis line 50*a* of the lock pin. In a case where two body engagement hooks 44 are provided at the body leg 40, the pin leg 54 is connected to each of the two long sides of the rectangular pin head 52, i.e., two pin legs 54 are provided. In a case where four body engagement hooks 44 are provided at the body leg 40, the pin leg 54 is connected to each of the four sides of the rectangular pin head 52, i.e., four pin legs 54 are provided. In the embodiment shown in the drawings, two body engagement hooks 54 are provided, and two pin legs 54 are provided and oppose each other. The plural pin legs 54 are separated from each other and are connected to the pin head 52 only.

The pin deformable portions 58 is connected to the pin leg 54 at a connecting portion 66 located apart from the pin head 52 in the axial direction of the lock pin. The connecting portion 66 is defined as a portion located in a range between a pin leg-side end of the connecting portion 66 and a pin deformable portion-side end of the connecting portion 66 in the direction parallel to the center axis line 50*a* of the lock pin and located in a range of a thickness of the connecting portion at the pin leg-side end in a direction perpendicular to the center axis line 50*a* of the lock pin.

The pin deformable portion 58 extends from the connecting portion 66 connected with the pin leg 54 toward the pin head 52. The extending portion 64 which will be post-described extends in the axial direction of the lock pin from an end of the pin deformable portion 58*a* opposite the connecting portion 66 to an end surface of the pin head 52 opposite the pin leg 54 in the axial direction of the lock pin.

The pin deformable portion 58 is separated by a slit 68 from the pin leg 54 and the pin head 52 at opposite sides of the pin deformable portion 58. Due to this structure, the pin deformable portion 58 is elastically deformable about the connecting portion 66 in the direction perpendicular to the axial direction of the lock pin. As illustrated in FIG. 7, since an inside surface 54*b* of the pin leg 54 is connected to an inside surface 58*b* of the pin deformable portion 58 via a curved portion, a thickness of the connecting portion 66 gradually decreases from the pin leg 54-side end of the connecting portion 66 to the pin deformable portion 58-side end of the connecting portion 66. A center in a thickness direction of the connecting portion 66 at the pin deformable portion-side end of the connecting portion 66 constructs a fulcrum 66*a* of deformation for an elastic deformation of the pin deformable portion 58. Since the pin deformable portion 58 is elastically deformed about the fulcrum 66*a* of deformation, the pin engagement hook 56 can be elastically displaced in the direction perpendicular to the center axis line 50*a* of the lock pin.

The pin engagement hook 56 includes a hook end portion 60 and a connecting portion 62 connecting the pin end portion 60 and an outside surface 58*a* of the pin deformable portion 58. The pin end portion 60 and the connecting portion 62 are formed integral with each other, and the connecting portion 62 and the pin deformable portion 58 are formed integral with each other. A width of the pin engagement hook 56 is narrower than a width of the pin deformable portion 58.

[Engagement Structure of the Lock Pin with the Clip Body]

As illustrated in FIGS. 1-3 and FIGS. 7-9, at the pair of side walls 22L of the body head 12 of the clip body 10, and at the longitudinal central portions 22Lc of the side walls 22L, the temporary holding aperture 26 and a secure holding aperture 28 disposed at an inner position than the temporary holding aperture are provided, on opposite sides of the center axis line 10*a* of the clip body in a direction perpendicular to the center axis line 10*a* of the clip body and perpendicular to the longitudinal direction of the CSA. The temporary holding aperture 26 and the secure holding aperture 28 are provided in this order in a direction from the tip portion of the body head 12 toward the flange 14, and are spaced from each other in the axial direction of the clip body.

The pin engagement hook 56 protrudes more outward than an outside surface of the pin leg 54. When inserting the lock pin 50 into the lock pin inserting hole 20, the pin engagement hook 56 is pushed by the pair of side walls 22L and is elastically deformed thereby receding toward the center axis line 50*a* of the lock pin. When the pin engagement hook 56 comes to the temporary holding aperture 26, the pin engagement hook 56 returns to an original position due to an elasticity of the pin deformable portion 58 and enters the temporary holding aperture 26.

When the lock pin 50 is located at the temporary holding position P1, a lower end of the pin leg 54 is located above an upper end of the body engagement hook 44. As a result, when inserting the body leg 40 of the clip body 10 into the fixing apparatus mounting aperture 90*d* of the body 90, the body engagement hook 44 can recede toward the center axis line 10*a* of the clip body.

When the lock pin 50 is positioned at the temporary holding position P1, the body leg 40 is caused to penetrate a penetration aperture 80*c* of a CSA tab 80*b* and a leg inserting aperture 72 of a spacer 70 and further is inserted into and through the fixing apparatus mounting aperture 90*d*, whereby the CSA 80 is fixed to the vehicle body 90 by the fixing apparatus 1. At this moment, the lock pin 50 is yet at the temporary holding position P1.

As illustrated in FIG. 7, the hook end portion 60 is offset on a side opposite the center axis line 50*a* of the lock pin, relative to a line 50*b* which passes through the fulcrum 66*a* of deformation of an elastic deformation of the pin deformable portion 58 and extends parallel to the center axis line 50*a* of the lock pin.

Due to this structure, when pushing the lock pin 50 positioned at the temporary holding position P1, an upward force F1 acts on the hook end portion from a lower surface of a temporary holding aperture 26-defining edge of the clip body. As a result, the pin deformable portion 58 is deformed about the fulcrum 66*a* of deformation toward an inner direction M1, whereby the hook end portion 60 disengages from the temporary holding aperture 26-defining edge of the clip body and can smoothly move to an inner position of the lock pin inserting hole.

Figure 11:
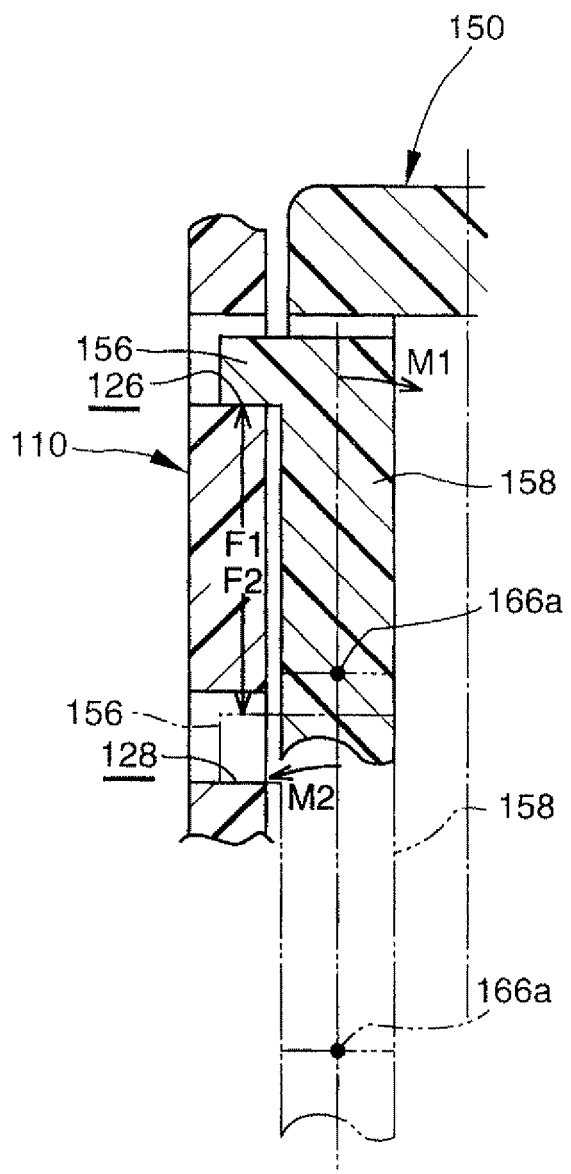
FIG. 11 is a schematic cross-sectional view of a pin engagement hook of a lock pin and a portion of a clip body in a vicinity of a holding aperture, of a comparison fixing apparatus.

FIG. 11 illustrates an engagement structure of a lock pin 150 in a comparison fixing apparatus. When pushing a pin engagement hook 156 engaging the temporary holding aperture 126 of the clip body 110 to a secure holding aperture 128, a force F1 acts on the pin engagement hook from a temporary holding aperture 126-defining edge of the clip body and inclines the pin engagement hook 156 in a closing direction (M1) about the fulcrum 166*a* of deformation, so that the pin engagement hook 156 recedes and can smoothly move to the secure holding aperture 128. When the pin engagement hook 156 comes to the secure holding aperture 128, the pin deformable portion 158 returns to an original rotational position due to an elasticity and enters the secure holding aperture 128. Accordingly, movement of the lock pin 50 in the present invention and that in the comparison apparatus are smooth to the same extent.

After the CSA 80 is fixed to the vehicle body 90, the lock pin 50 is pushed by a tool (not shown) and is moved to an inner portion of the lock pin inserting hole 20.

When the lock pin 50 is moved to the inner portion of the lock pin inserting hole 20 and the pin engagement hook 56 comes to the secure holding aperture 28, the pin deformable portion 58 returns to an original position due to an elasticity. As a result, the pin engagement hook 56 enters the secure holding aperture 28, and the lock pin 50 is held at the secure holding position P2.

As illustrated in FIG. 8, when the lock pin 50 is positioned at the secure holding position P2, the lower end of the pin leg 54 of the lock pin 50 is located lower than the upper end of the body engagement hook 44 of the clip body 10 so that the pin leg 54 is located between the body engagement hook 44 and the back-up rib 48. As a result, the body engagement hook 44 of the clip body 10 can not recede toward the center axis line 10a of the clip body so that the clip body 10 can not be removed from the body 90 and is locked to the body 90.

[Lock Pin Removing Structure]

As illustrated in FIGS. 4-6, the pin engagement hook 56 is integrally formed at an outside surface of a pin head-side end portion of the pin deformable portion 58.

The extending portion 64 extends from the pin head-side end portion of the pin deformable portion 58, i.e., a portion of the pin deformable portion, at an outside surface of which the pin engagement hook 56 is formed, toward the pin head 52 in the axial direction of the lock pin. An end surface of the extending portion 64 is located at the same position in the axial direction of the lock pin as an end surface of the pin head 52. A width of the extending portion 64 in the front elevational view of the lock pin is substantially equal to a width of the pin deformable portion 58 and is wider than a width of the pin engagement hook 56. There is a space capable of receiving a tip of the lock pin removing tool 3 such as cutting pliers between an outside surface 64a of the extending portion 64 in a thickness direction and an inside surface of the longitudinally central portions 22Lc of the side walls 22L of the clip body 10.

The extending portion 64 is provided on each of opposite sides of the center axis line 10a of the lock pin, and a pair of extending portions 64 is provided. When the lock pin is removed, the extending portions 64 are pinched at the outside surfaces 64a of the extending portions 64 by the tool 3.

As illustrated in FIGS. 7 and 8, the outside surface 64a of the extending portion 64 in the thickness direction of the extending portion is offset from an extension of the outside surface 58a of the pin deformable portion 58 in the thickness direction of the pin deformable portion toward the center axis line 50a of the lock pin. Due to the structure, at the time of removing the lock pin, it is easy to insert the end portion of the lock pin removing tool 3 into the space between the outside surface 64a of the extending portion 64 in a thickness direction and an inside surface of the longitudinally central portions 22Lc of the side walls 22L of the clip body 10.

Further, an inside surface 64b of the extending portion 64 is inclined in a direction from a connecting portion of the extending portion with the pin deformable portion 58 toward the end portion of the extending portion 64 so as to be apart away from the center axis line 50a of the lock pin. Further, the inside surface 58b of the pin deformable portion 58 is offset so as to be more apart from the center axis line 50a of the lock pin than the inside surface 54b of the pin leg 54. Due to these structures, a space between the inside surface 64b of the extending portion 64 and a surface 52a of the pin head opposing the inside surface 64b is increased. As a result, when the extending portions 64 are pinched by the lock pin removing tool 3 at the time of removing the lock pin, an angle of the extending portion 64 falling inward about the fulcrum 66a of deformation is increased so that the hook end portion 60 can easily disengage from the secure holding aperture 28 or the temporary holding aperture 26.

As illustrated in FIG. 9, in the state that the paired extending portions 64 are pinched by the tool 3 and the hook end portion 60 disengages from the secure holding aperture 28 or the temporary holding aperture 26, an outer end portion 60c (FIG. 4) of the hook end portion 60 is positioned on a side closer to the center axis line 10a of the clip body than an inside surface 20a of the clip body defining the lock pin inserting hole 20.

Therefore, by pulling the lock pin 50 while the paired extending portions 64 are pinched by the tool 3, the lock pin 50 can be removed without causing an interference of the hook end portion 60 with the inside surface 20a of the clip body defining the lock pin inserting hole 20.

Contrarily, in the comparison apparatus of FIG. 11, when extracting the lock pin 150 where the pin engagement hook 156 engages the secure holding aperture 128, a force F2 acts on the pin engagement hook 156 from an upper portion of the secure holding aperture-defining edge of the clip body, so that the pin engagement hook 156 is likely to fall in an opening direction M2. As a result, the pin engagement hook 156 more enters the secure holding aperture 128, which makes removal of the lock pin 50 difficult. In the present invention, because the force F2 does not act, removal of the lock pin is smooth.

As illustrated in FIGS. 4 and 6, the connecting portion 62 of the pin engagement hook 56 includes a first surface 62a. The first surface extends obliquely from an a pin head-side end 60d of the hook end portion 60 of the pin engagement hook 56 in a direction away from the pin head 52 and toward the center axis line 50a of the lock pin, and is connected to the outside surface 64a of the extending portion 64.

The outside surface 64a of the extending portion 64 and the first surface 62a of the pin engagement hook 56 form a concave portion 67 that is open and enlarged in width toward the pin head 52. An end of the first surface 62a on a side close to the outside surface 64a of the extending portion may construct a curved bottom surface of the concave portion 67.

As illustrated in FIG. 9, when entering the lock pin removing tool 3 into the concave portion 67 at the time of removing the lock pin, the tip of the tool 3 contacts the curved bottom surface of the concave portion 67 and stops. The stopping position is an appropriate position of the tool 3 for pinching the pair of extending portions 64. Therefore, the lock pin removing tool 3 can pinch the pair of extending portions 64 at the appropriate position.

The hook end portion 60 of the pin engagement hook 56 includes a second surface 60a (FIG. 6) and a third surface 60b (FIG. 4). The second surface 60a extends from an outside surface 62b of the connecting portion 62 to the outer end portion 60c of the hook end portion 60 in a direction perpendicular to the center axis line 50a of the lock pin and away from the center axis line 50a of the lock pin. The third surface 60b extends obliquely from the outer end portion 60e of the hook end portion 60 to a pin head-side end 60d of the hook end portion 60 in a direction toward the pin head 52 and toward the center axis line 50a of the lock pin.

Figure 10:
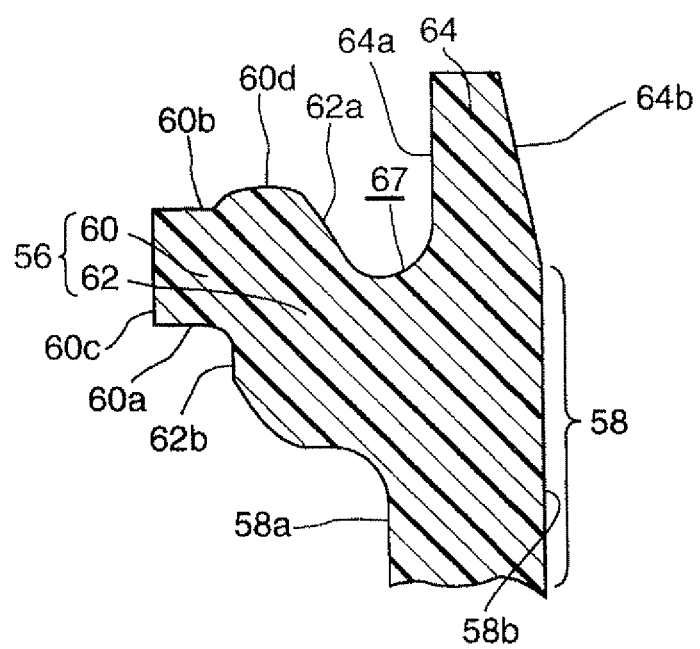
FIG. 10 is an enlarged, side elevational view of a pin engagement hook of a lock pin according to an alteration of the present invention.

At an early stage of development of the CSA, in a case where an excessively large force acts on the fixing apparatus 1 (the clip body 10) via the tab 80b of the CSA, the lock pin 50 may happen to disengage from the secure holding aperture 28 of the clip body 10. In order to prevent this disengagement, as illustrated in FIG. 10, the third surface 60b of the pin engagement hook 56 may be made a flat surface parallel to an upper edge of the secure holding aperture 28. When the third surface 60b of the pin engagement hook 56 is made a flat surface, the lock pin 50 is unlikely to disengage, even if an excessively large force is loaded on the clip body 10 at an early stage of development of the CSA. If the lock pin 50 is designed unlikely to disengage, it will be further difficult to remove the lock pin 50 at the time of maintenance. However, the paired extending portions 64 are provided at the lock pin 50, it is easy to remove the lock pin 50 in the present invention.

[Spacer of the Fixing Apparatus]

As illustrated in FIGS. 1-3, a shape of the spacer 70 is rectangular in a plan view when viewed along the center axis line 10a of the clip body. The spacer 70 has a leg inserting aperture 72 at a central portion of the rectangular shape. The body leg 40 fits with the leg inserting aperture 72. The spacer 70 includes an elastically deformable portion 76 which is formed from spacer portions located closer to a center of the leg inserting aperture 72 in a longitudinal direction of the spacer than opposite ends of the leg inserting aperture 72 in the longitudinal direction of the spacer, to opposite ends of the spacer in the longitudinal direction of the spacer. The elastically deformable portion 76 is elastically deformable in the axial direction of the clip body.

In a state that the spacer 70 fits with the clip body 10 at the body leg 40, the elastically deformable portion 76 of the spacer 70 is curved or straightly inclined in a direction toward the opposite longitudinal ends of the spacer 70 and away from the body head 12 in the axial direction of the clip body.

In the state that the spacer 70 fits the clip body 10 at the body leg 40, at a back surface of the spacer 70 opposite a clip head-facing surface of the spacer, at least one protrusion 78 is formed at a spacer portion located closer to the center of the leg inserting aperture 72 in the longitudinal direction of the spacer than the end of the leg inserting aperture 72 in the longitudinal direction of the spacer. When coupling the spacer 70 to the clip body 10, the spacer 70 is placed on a spacer placing rack (not shown) which has a flat upper surface. The protrusion 78 is provided so that the spacer 70 can be stably placed on the spacer placing rack.

Though FIGS. 1-3 and FIGS. 7-9 show the embodiment where the elastically deformable portion 76 is formed along the longitudinal direction of the spacer, the elastically deformable portion 76 is not limited to one formed along the longitudinal direction of the spacer. For example, the elastically deformable portion 76 may be formed along a direction perpendicular to the longitudinal direction of the spacer.

[Fixing Apparatus Removing Structure]
[Structure Relating to the Clip Body, of the Fixing Apparatus Removing Structure]

As illustrated in FIGS. 12-15, the fixing apparatus removing structure 5 includes an assembly of the fixing apparatus 1 and a tool 4 used for removing the fixing apparatus 1 from the vehicle body 90. Because the fixing apparatus removing structure 5 is a structure for removing the clip body 10 of the fixing apparatus 1, the fixing apparatus removing structure 5 may be called as a clip body removing structure 5.

In the fixing apparatus 1, a groove 44a is formed at a central portion, central in a width direction, of the body engagement hook 44 in a front view viewed in the direction perpendicular to the center axis line 10a of the clip body. The groove 44a has a groove bottom surface 44b extending inclinedly from the outside surface 44d toward the body head 12 and the center axis line 10a of the clip body. The groove bottom surface 44b is defined as a groove surface facing the body head 12 in a cross section which is perpendicular to a longitudinal direction, i.e., an extending direction of the groove.

The body engagement hook 44 includes the outside surface 44d and the inside surface 44g located closer to the center axis line 10a of the clip body than the outside surface 44d. The groove bottom surface 44b is formed over a range between the outside surface 44d and the inside surface 44g. Therefore, the groove bottom surface 44b does not extend to the upper surfaces 44e and 44f from the outside surface 44d of the body engagement hook 44. In a cross section of the fixing apparatus 1 of FIGS. 7-9, an inside surface of the side wall defining the lock pin inserting hole 20 includes a portion 20a, a portion 20b, a portion 20c and the inside surface 44g of the body engagement hook 44. The portion 20a is located at a position corresponding to the flange 14 and at a position closer to the open end of the lock pin inserting hole than the flange 14 and extends parallel to the center axis line 10a of the clip body. The portion 20b obliquely extends in a direction opposite the open end of the lock pin inserting hole from an end of the portion 20a opposite the open end of the lock pin inserting hole. The portion 20c extends in a direction opposite the open end of the lock pin inserting hole and parallel to the center axis line 10a of the clip body from an end of the portion 20b opposite the open end of the lock pin inserting hole to the slit 46 located just above the body engagement hook 44.

The inside surface 44g of the body engagement hook 44 is located on a side closer to the center axis line 10a of the clip body than the portions 20a, 20b and 20c of the inside surface of the side wall defining the lock pin inserting hole 20 which are located on a side closer to the open end of the lock pin inserting hole than the body engagement hook 44. Therefore, in a state that the lock pin 50 is removed from the clip body 10, a portion of the groove bottom surface 44b including an end portion 44c located on a side of a center axis line 10a of the clip body (i.e., a portion of the groove bottom surface visible from the open end of the lock pin inserting hole) is open and released toward the body head 12, i.e., toward the open end of the lock pin inserting hole through a portion of the lock pin inserting hole 20 located closer to the open end of the lock pin inserting hole than the body engagement hook 44.

Due to this structure, when removing the clip body 10 from the vehicle body 90, it is possible to insert the clip body removing tool (which may be simply called as a tool, hereinafter) 4 into the lock pin inserting hole 20 from the open end of the lock pin inserting hole and to push the portion of the groove bottom surface 44b including the end portion 44c (i.e., the groove bottom surface portion visible from the open end of the lock pin inserting hole) by the tip of the tool 4. The end portion 44c of the groove bottom surface 44b may be an inclined surface which is convexly curved (including a case of "bent") toward the body head 12. Due to the inclined surface convexly curved, an acute angle at the inner end of the groove is mitigated so that the end portion 44c is suppressed from being deformed and damaged when the end portion 44c is pushed by the tool 4.

The portion 20c located just above the slit 46, of the inside surface of the wall defining the lock pin inserting hole 20 is provided on each of opposite sides of the center axis line 10a of the clip body, and therefore, a pair of portions 20e is provided. A space between the portions 20c is equal to or a little larger than a width of the tool 4 so that the portion 20c acts as a guide surface when inserting the tool 4.

Figure 15:
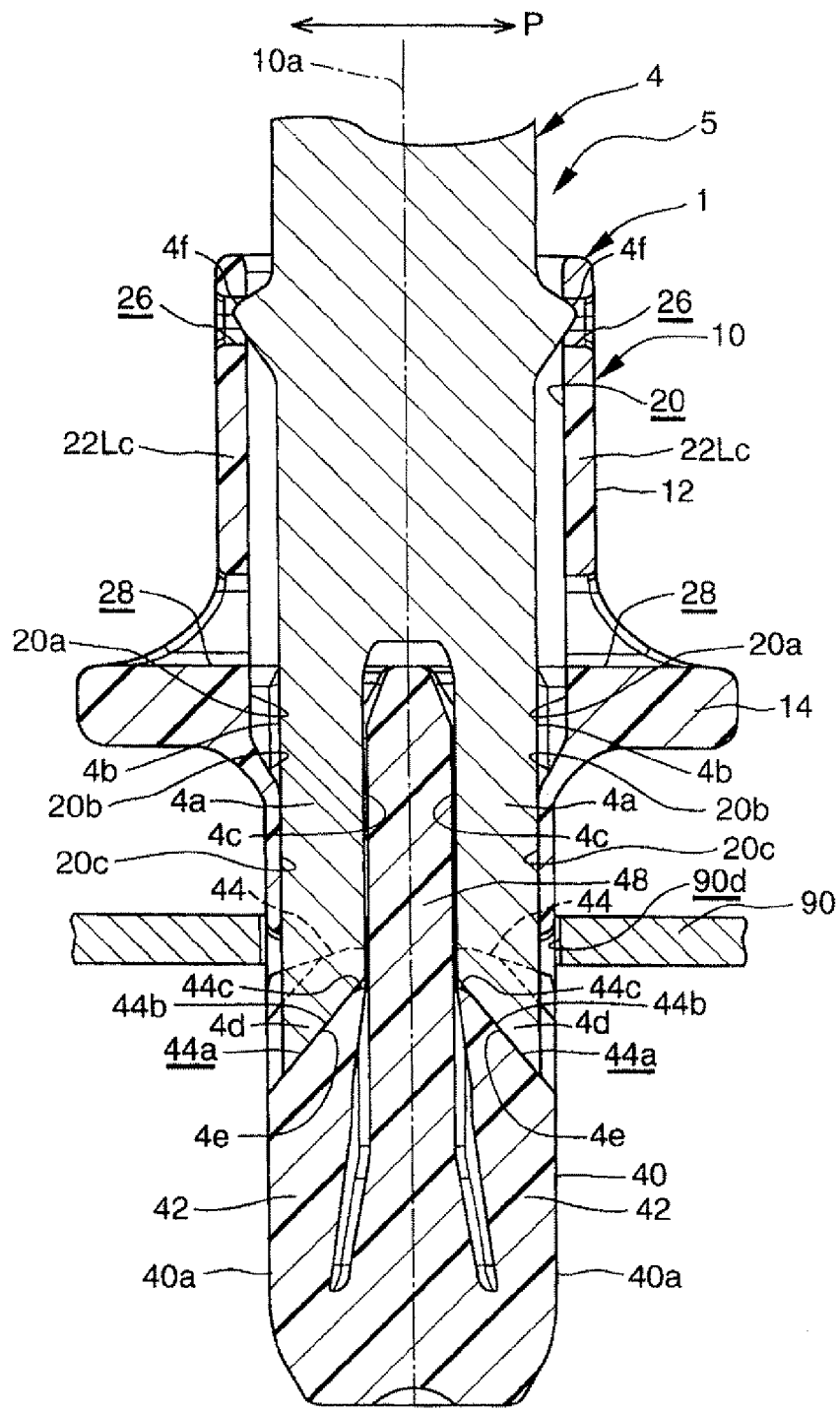
FIG. 15 is a cross-sectional view of the clip body and the fixing apparatus removing tool of FIG. 14.
Figure 16:
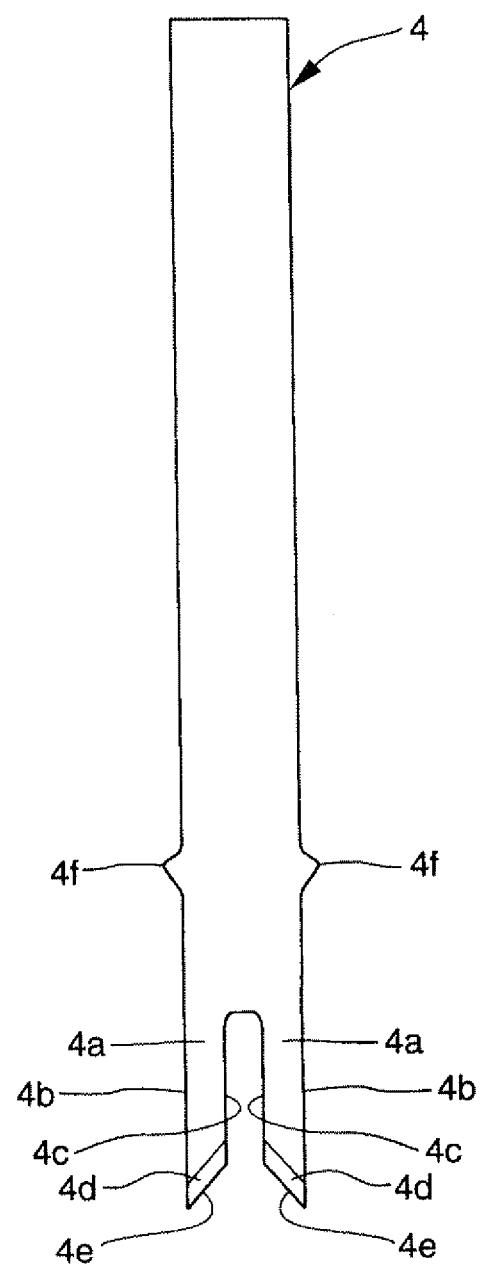
FIG. 16 is a front elevational view of the fixing apparatus removing tool.
Figure 17:
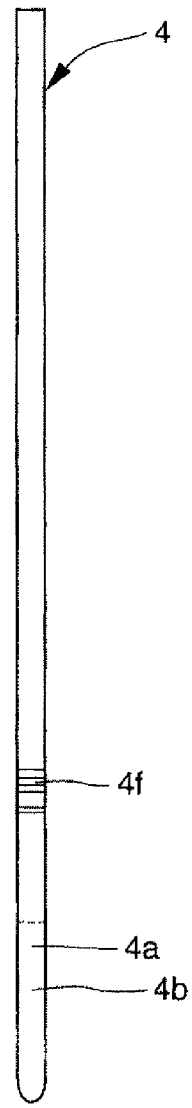
FIG. 17 is a side elevational view of the fixing apparatus removing tool of FIG. 16.
Figure 18:
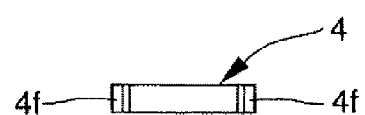
FIG. 18 is a plan view of the fixing apparatus removing tool of FIG. 16.
Figure 19:
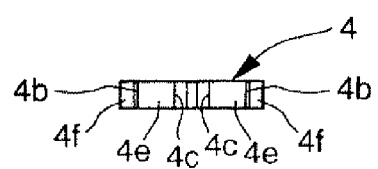
FIG. 19 is a bottom view of the fixing apparatus removing tool of FIG. 16.

A space provided between the inside surface 44g of the body engagement hook 44 and the back-up rib 48 in the direction perpendicular to the center axis line 10a of the clip body is predetermined in magnitude such that when elastically displacing the body engagement hook 44 toward the center axis line 10a of the clip body by the tool 4, the outside surface 44d of the body engagement hook 44 comes to a position closer to the center axis line 10a of the clip body than the outside surface 40a of the portion of the body leg 40 except the body engagement hook 44 (as shown in FIG. 15). As a result, while the body engagement hook 44 is pinched by the tool 4 and is elastically displaced toward the center axis line 10a of the clip body, the body engagement hook 44 can pass through the fixing apparatus mounting aperture 90d of the vehicle body 90, so that by extracting the tool 4, the clip body 10 can be removed from the vehicle body 90 as it is.

[Structure of the Clip Body Removing Tool, of the Fixing Apparatus Removing Structure]

The tool 4 is made from a hard material such as metal, e.g., stainless steel, or hard plastic.

In the case of metal, the tool 4 is manufactured easily and at a low cost by punching a flat plate material using a stamping machine.

The tool 4 includes an inclined portion 4e, provided at a tip of the tool in a tool inserting direction into the lock pin inserting hole 20, for contacting and pushing the groove bottom surface 44b and displacing the body engagement hook 44 toward the center axis line 10a of the clip body when the tool 4 is inserted into the lock pin inserting hole 20.

The tool 4 includes a forked portion 4a provided at the tip of the tool in the tool inserting direction into the central hole 20. The inclined portion 4e is formed at a tip of the forked portion 4a in the tool inserting direction into the central hole 20. The inclined portion 4e of the tool 4 inclinedly extends in a direction from an outside surface 4b of the forked portion 4a toward an inside surface 4c located on a side of a center of the forked portion in the width direction of the forked portion and in a direction opposite the tool inserting direction into the central hole 20. As illustrated in FIG. 15, an inclination angle of the inclined portion 4e is equal to or substantially equal to an inclination angle of the groove bottom surface 44b of the body engagement hook 44 when the body engagement hook 44 is displaced toward the center axis line 10a of the clip body. Due to the inclined portion 4e, a pushing movement of the tool 4 causes the body engagement hook 44 to be displaced toward the center axis line 10a of the clip body. Further, in the case where the paired body engagement hooks 44 are provided, the tool 4 having the forked portion 4a can displace the paired body engagement hooks 44 toward the center axis line 10a of the clip body at the same time.

The groove bottom surface 44b of the body engagement hook 44 is a concave surface concave when facing the body head 12, in the cross section perpendicular to the longitudinal direction of the groove 44a (i.e., the extending direction of the groove 44a).

The concave surface may be a concave curved surface or a flat bottom surface of a rectangular cross section. Further, the inclined portion 4e of the tool 4 is a convex surface convex relative to the groove bottom surface 44b in a cross section perpendicular to a longitudinal direction of the inclined portion 4e (i.e., an extending direction of the inclined portion 4e).

Figure 13:
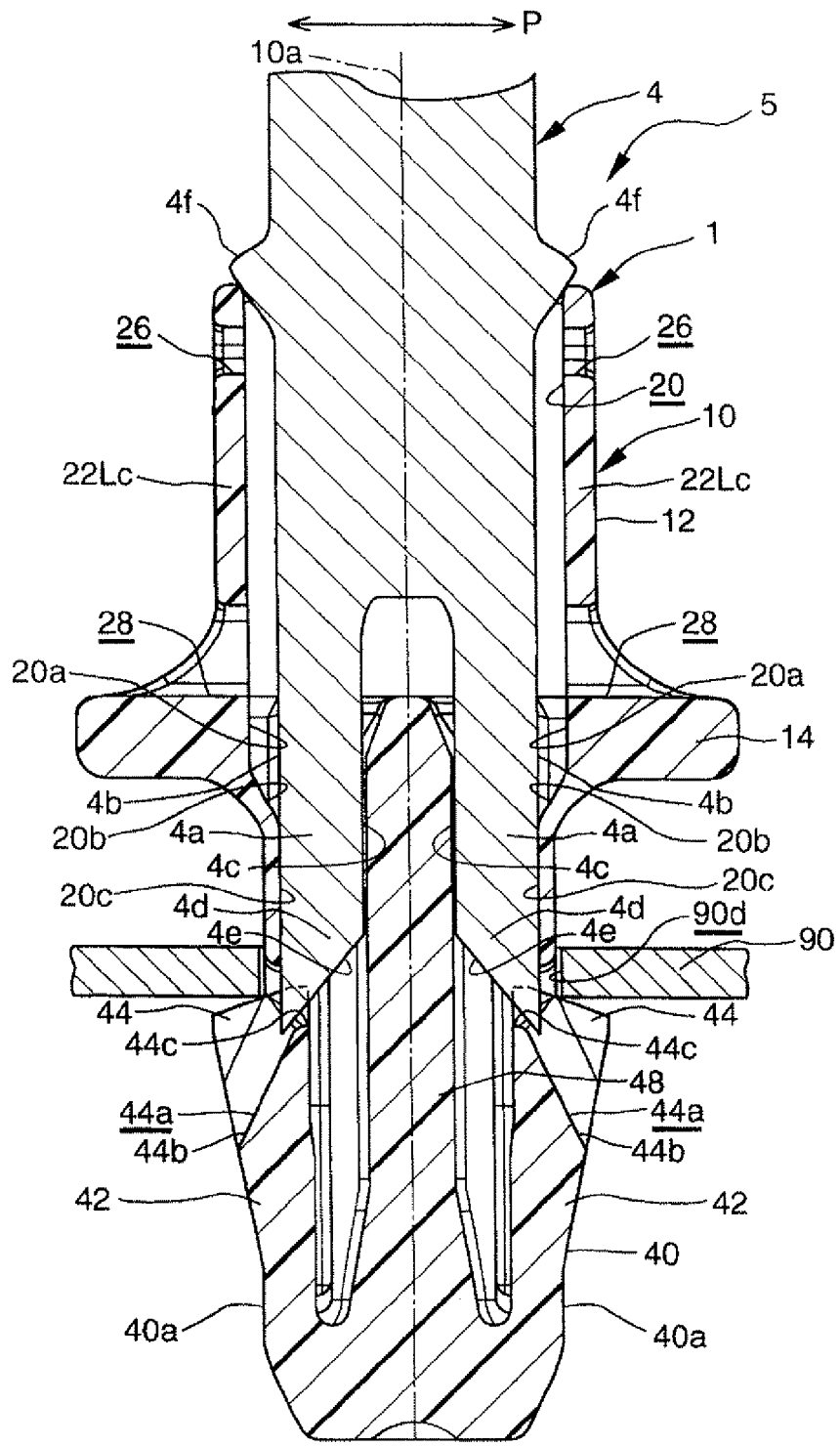
FIG. 13 is a cross-sectional view of the clip body and the fixing apparatus removing tool after the fixing apparatus removing tool is inserted into the lock pin inserting hole and just before a tip of the tool contacts a body engagement hook.
Figure 14:
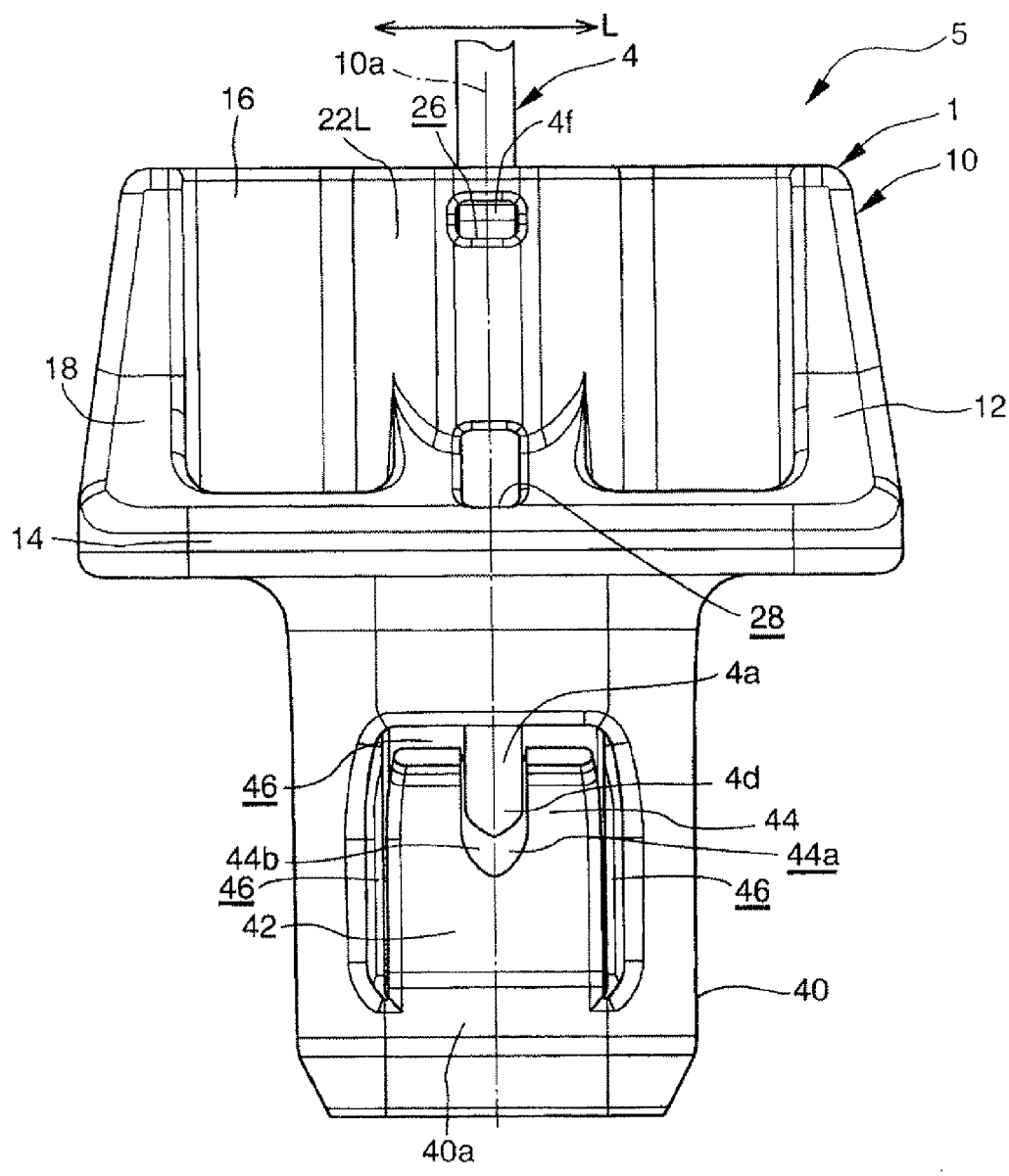
FIG. 14 is a front elevational view of the clip body and the fixing apparatus removing tool when the tip of the fixing apparatus removing tool pushes the body engagement hook and displaces the body engagement hook and when a protrusion of the hook enters a temporary holding aperture.

As illustrated in FIGS. 13 and 15, a space defined between the paired inside surfaces 4c of the forked portion 4a is a space for receiving the back-up rib 48 of the clip body 10 therein when the tool 4 is inserted into the lock pin inserting hole 20. Due to the space, the tool 4 can be inserted into the lock pin inserting hole 20 without causing an interference between the tool 4 and the back-up rib 48.

The tool 4 has a protrusion 4f which protrudes toward the inside surface 20a of the lock pin inserting hole 20-defining wall, at a tool surface facing the inside surface 20a of the lock pin inserting hole 20-defining wall when the tool 4 is inserted into the lock pin inserting hole 20. The protrusion 4f is provided at each of the outside surfaces in the width direction, of the tool 4, and a pair of protrusions 4f is provided.

Each protrusion 4f has such a height in a direction perpendicular to the center axis line 10a of the clip body as causes the protrusion 4f to interfere with the inside surface 20a of the lock pin inserting hole 20-defining wall or causes the protrusion 4f to enter the lock pin engagement aperture 26, 28 formed at the wall 22Lc of the lock pin inserting hole 20.

As illustrated in FIG. 15, the protrusion 4f is formed at the tool 4 desirably at such a position in a longitudinal direction of the tool 4 as when the tool 4 displaces the body engagement hook 4 toward the axial center line 10a of the clip body, the protrusion 4f enters the temporary holding position 26. However, the protrusion 4f may be formed at the tool 4 at such a position in the longitudinal direction of the tool 4 as when the tool 4 displaces the body engagement hook 4 toward the center axis line 10a of the clip body, the protrusion 4f enters the secure holding position 28 or interferes with a portion of the inside surface 20a of the lock pin inserting hole-defining wall located between the temporary holding position 26 and the secure holding position 28. When the tool 4 is inserted, the protrusion 4f makes the pair of side walls 22Lc located at the open end of the lock pin inserting hole be elastically deformed and enlarges the space between the pair of side walls 22Lc.

When the clip body removing tool 4 is not ready at hand, by using two drivers or drills each having a slender tip, causing the drivers or drills to cross to each other, and inserting the drives or drills into the lock pin inserting hole 20, pushing the groove bottom surfaces 44b downward by the drivers or drills, and pinching the groove bottom surfaces by the drivers or drills and then extracting the clip body upward, the clip body 10 can be easily removed from the vehicle body 90.

[CSA Fixing Apparatus]

Figure 20:
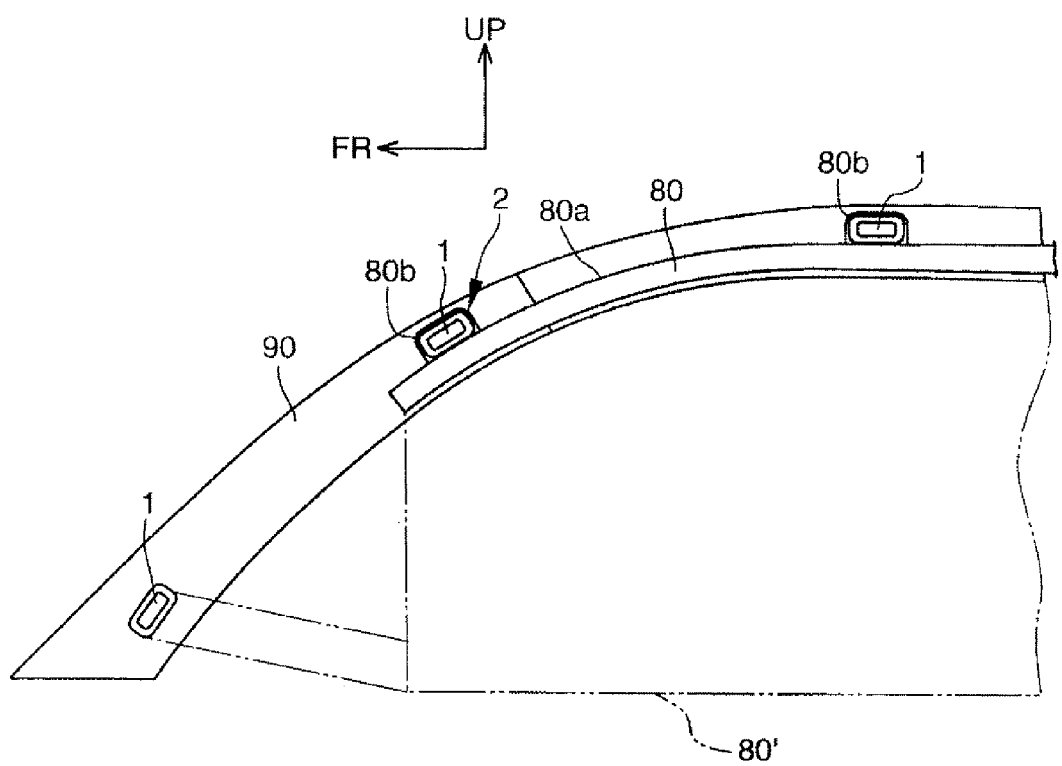
FIG. 20 is an arrangement of the fixing apparatus in the vehicle.
Figure 21:
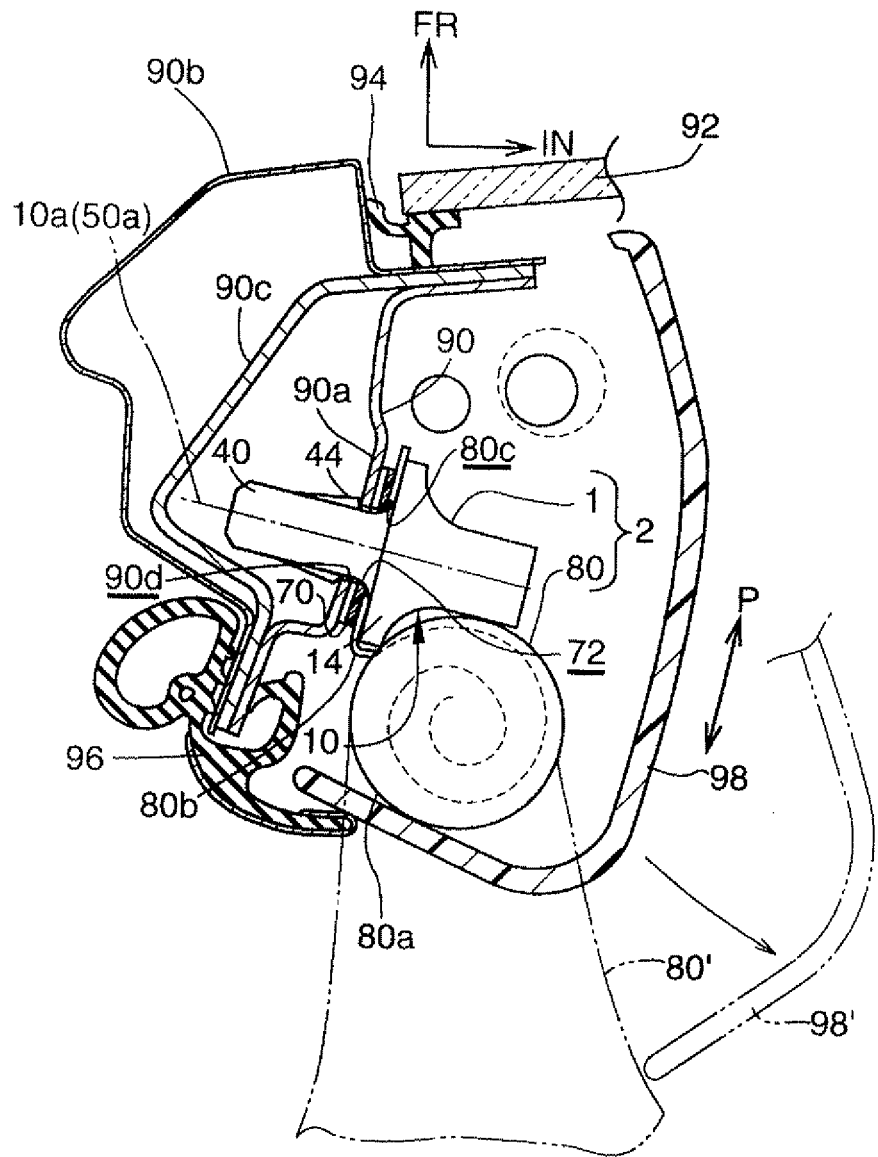
FIG. 21 is a cross-sectional view of a CSA fixing apparatus according to an embodiment of the present invention at a front pillar portion.

As illustrated in FIGS. 20 and 21, the CSA fixing apparatus 2 is an apparatus for fixing a member to be fixed, for example, the CSA 80 to the vehicle body 90 using the fixing apparatus 1.

The CSA fixing apparatus 2 includes the member to be fixed, for example, the CSA 80 and the fixing apparatus 1 for fixing the CSA 80 to the vehicle body 90 at the tab 80b. The member to be fixed may be a member other than the CSA 80, for example, a CSA casing (not shown).

In FIGS. 21 and 22, the vehicle body 90 to which the CSA 80 is fixed is, for example, a front pillar (which may be called as an A-pillar). However, the vehicle body to which the CSA is fixed is not limited to the A-pillar and may be a side rail.

FIG. 21 shows a case where the vehicle body 90 to which the CSA 80 is fixed is an A-pillar. The body 90 includes an inner panel 90a, an outer panel 90b and a reinforcement 90c and is made from metal, for example, steel.

Further, FIG. 21 shows a front shield glass 92 of the vehicle, weather strips 94 and 96, and the A-pillar garnish 98.

Figure 12:
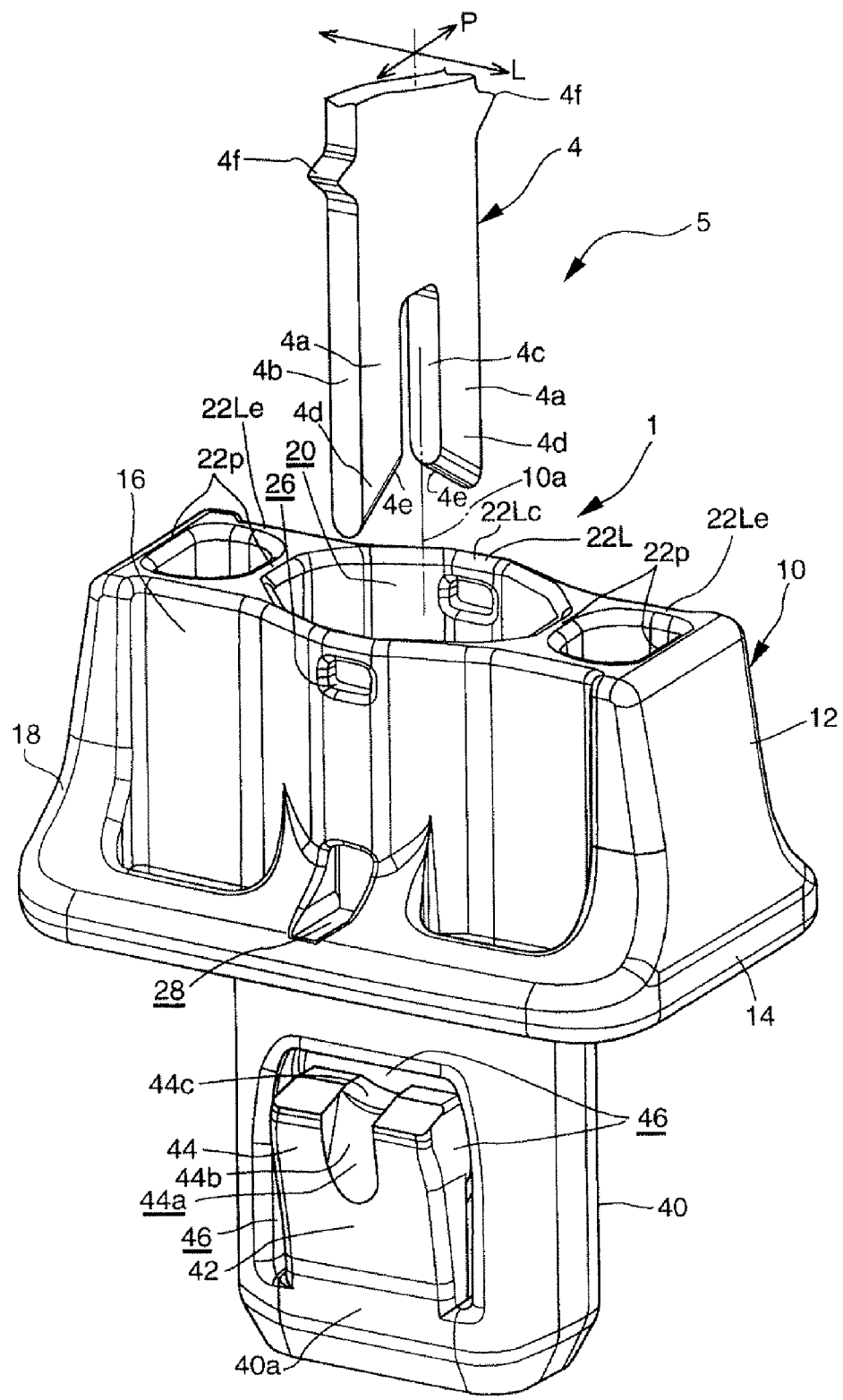
FIG. 12 is a perspective view of the clip body and a fixing apparatus removing tool (a clip body removing tool) after the lock pin is removed and before the fixing apparatus removing tool is inserted into a lock pin inserting hole of the fixing apparatus.

The CSA 80 includes the main portion 80a extending in the longitudinal direction of the CSA and the tabs 80b extending from the main portion 80a toward the fixing apparatuses 1 at plural positions in the longitudinal direction of the CSA. The CSA 80 is made from a cloth and is housed in a space between the A-pillar garnish 98 and the inner panel 90a in a rolled or folded state. A cross-sectional configuration of the main portion 80a of the CSA 80 is substantially circular in the case of the rolled state as illustrated in FIG. 12 and is substantially rectangular in the case of the folded state. The main portion 80a of the CSA is located on a front shield glass-opposite side (at a rear side) of the fixed apparatus 1.

As illustrated in FIG. 21, at a time of a vehicle impact, the CSA 80 is supplied with a gas for expansion from an inflator (not shown) and is developed thereby pushing the A-pillar garnish 98 in the direction away from the inner panel 90a by means of the developing pressure. The CSA 80 is developed toward a space between a passenger and a side door through an opening formed between the A-pillar garnish 98 and the inner panel 90a, thereby restricting the passenger from a side of the side door. In FIG. 21, "98" shows a portion of the A-pillar garnish 98 which has been pushed and open, and "80" shows a portion of the CSA 8 which has been developed.

The CSA fixing apparatus 2 can take a first state where the fixing apparatus 1 is going to be fixed to or has been fixed to the vehicle body 90, a second state where the lock pin 50 is capable of being removed from the clip body 10 using the lock pin removing tool (device) 3, and a third state where the fixing apparatus 1 is capable of being removed from the vehicle body 90 using the fixing apparatus removing tool (jig) 4. The first state is shown in FIGS. 1-8 except the body 90. The second state is shown in FIG. 9. The third state is shown in FIGS. 12-15. The tool 4 is shown in FIGS. 16-19.

At the first state, when the lock pin 50 is positioned at the temporary holding position P1 (FIGS. 1, 2 and 7), the body leg 40 of the clip body 10 is caused to extend through the leg inserting aperture 80c of the tab 80b of the CSA 80 and the leg inserting aperture 72 of the spacer 70 and is pushed so as to extend through the fixing apparatus mounting aperture 90d of the vehicle body 90 (FIG. 21). The body engagement hook 44 of the clip body 10 recedes when passing through the fixing apparatus mounting aperture 90d, and protrudes due to the elasticity of the hook itself when having passed the fixing apparatus mounting aperture 90d thereby engaging the body 90. At that time, the tab 80b of the CSA 80 and the spacer 70 are placed between the flange 14 of the clip body 10 and body 90. Then, the lock pin 50 is further pushed to an inner position of the lock pin inserting hole 20, i.e., to the secure holding position P2 (FIG. 8). At the state, the body engagement hook 44 is incapable of receding, so that the clip body 10 is locked to the body 90 so as not to be removed from the fixing apparatus mounting aperture 90d.

At the second state, the tip of the lock pin removing tool 3 is inserted to a space between the inside surface 20a of the lock pin inserting hole 20-defining wall of the clip body 10 and the pair of extending portions 64 of the lock pin 50 (FIG. 9). The extending portions 64 are pinched at the outside surfaces of the extending portions 64 by the tool 3, e.g., the cutting pliers and are displaced toward the center axis line 50a of the lock pin.

The hook end portion 60 disengages from the secure holding aperture 28, and the lock pin 50 is removable from the lock pin inserting hole 20. At this state, by extracting the tool 3 while the extending portions 64 are pinched by the tool 3, the lock pin 50 can be removed from the lock pin inserting hole 20.

At the third state, by inserting the clip body removing tool 4, which is a tool different from the lock pin removing tool 3, into the lock pin inserting hole 20 and pushing the groove bottom surface 44b by the tip of the tool 4, the body engagement hook 44 is caused to recede toward the center axis line 10a of the clip body. While the body engagement hook 44 recedes toward the center axis line 10a of the clip body more than outside surface 40a of the body leg 40 of the clip body 10, the clip body 10 is extracted from the fixing apparatus mounting aperture 90d of the body 90 by pulling the tool 4 so that the fixing apparatus 1 is removed from the body 90. The spacer 70 and the CSA tab 80b may engage the clip body 10 or may be disengaged from the clip body 10.

Next, operations and technical advantages of the fixing apparatus 1, the fixing apparatus removing structure 5 and the CSA fixing apparatus 2 will be explained in this order.

[Operations and Technical Advantages of the Fixing Apparatus]
[Operations and Technical Advantages of the Clip Body]
Before the member to be fixed, e.g., the CSA 80 is fixed to the vehicle body 90, the fixing apparatus 1 is conveyed and handled in the state that the lock pin 50 is coupled to the clip body 10 at the temporary holding position P1.

In the CSA fixing apparatus 2 of FIG. 21, when the CSA 80 is coupled to the vehicle body 90, the body leg 40 is pushed to extend through the fixing apparatus mounting aperture 90d of the body 90. At that time, the lock pin 50 is positioned at the temporary holding position P1.

Then, the lock pin 50 is pushed so as to move from the temporary holding position P1 to the secure holding position P2 using a tool (not shown). At the state, the body engagement hook 44 cannot be displaced toward the center axis line 10a of the clip body, so that the clip body 1 is locked to the body 90 so as not to be removed from the fixing apparatus mounting aperture 90d.

In the conventional apparatus where a lock pin protrudes from a clip body, the lock pin happens to move from a temporary holding position to a secure holding position, receiving an impact load generated due to a collision between the clips during conveying the fixing apparatus. Further, the lock pin is erroneously pushed to move from the temporary holding position to the secure holding position when coupling the CSA to the vehicle body.

In such a case, the body engagement hook cannot be elastically displaced toward the axial center line of the clip body, so that the body leg cannot be inserted though the fixing apparatus mounting aperture.

In contrast, in the embodiment of the present invention, when the lock pin 50 is positioned at the temporary holding position P1, as illustrated in FIGS. 1, 2 and 7, the lock pin 50 does not protrude upward from the clip body 10 and is surrounded laterally by the side walls 22L and 22P. As a result, the lock pin 50 is prevented or suppressed from being moved from the temporary holding position P1 to the secure holding position P2 due to a collision between the clips during conveying the fixing apparatus. Further, the lock pin 50 positioned at the temporary holding position P1 is suppressed from being erroneously pushed by a finger when coupling the clip body 10 to the body 90. As a result, the lock pin 50 is suppressed from being erroneously inserted from the temporary holding position P1 to the secure holding position P2, and inability to couple the fixing apparatus 1 to the vehicle body 90 is unlikely to be caused.

Further, by setting an inserting force of the lock pin to the secure holding position higher than an inserting force of the clip body 10 to body 90, even if the inserting force of the clip body 10 to body 90 erroneously acts on the lock pin 50, an erroneous insertion of the lock pin 50 can be more prevented or suppressed.

When the fixing apparatus 1 is needed to be removed, e.g., at the time of maintenance, the lock pin 50 first is removed and then the clip body 10 is taken off from the body 90.

[Operations and Technical Advantages of the Lock Pin]

When the lock pin 50 is taken off from the clip body 10, the tool 3, e.g., the cutting pliers is inserted into the lock pin inserting hole 20, and the extending portions 64 and the pin engagement hooks 64 are displaced toward the center axis line 50a of the pin by pinching the extending portions 64 by the tool 3, so that the pin engagement hooks 56 are disengaged from the holding aperture 26 or 28. Then, extracting the tool 3 while pinching the pair of extending portions 64 by the tool 3, the lock pin 50 can be removed from the clip body 10.

Therefore, removal of the lock pin 50 from the clip body 10 is easy.

Since the outside surface of the extending portion 64 and the first surface 62a of the connecting portion 62 of the pin engagement hook 56 define the concave portion 67 opening toward the pin head, it is easy to insert the tool 3 into the concave portion 67 when the lock pin 50 is removed. Further, when the tool 3 reaches a bottom of the concave portion 67, the tool 3 stops and the stopping position defines a most appropriate position of the tool 3 for pinching the extending portions 64. Therefore, it is possible to pinch the extending portions 64 at the appropriate position by the tool 3. As a result, removal of the lock pin 50 from the clip body 10 is further easy.

The hook end portion 60 of the pin engagement hook 56 includes the second surface 60a which extends to the tip 60c of the hook end portion 60 in the direction perpendicular to the center axis line 50a of the lock pin and away from the center axis line 50a of the lock pin.

Therefore, when pushing and moving the lock pin 50 into the lock pin inserting hole 20, a force F1 (FIG. 7) directed toward the pin head 52 acts on the second surface 60a. Due to the force, the pin deformable portion 58 falls toward the center axis line 50a of the pin about the fulcrum 66a of deformation located at the connecting portion 66 of the pin deformable portion 58. As a result, it is easy to insert the lock pin 50 inward.

When the lock pin 50 is removed, the pin engagement hook 56 is displaced toward the center axis line 50a of the pin, by pinching the pair of extending portions 64 from the outside surfaces 64a by the tool 3. Therefore, the third surface 60b is unlikely to interfere with the clip body 10 and the pin head-side surface of the engagement aperture 26 or 28-defining edge of the side wall, so that the lock pin 50 can be easily removed. More particularly, in the present invention, the force F2 and the moment M2 which are generated in the comparison fixing apparatus of FIG. 11 do not act on the pin engagement hook 56.

Even if the third surface 60b interferes with the pin head-side surface of the engagement aperture 26 or 28-defining edge of the side wall when the lock pin 50 is removed, since the third surface 60b is inclined, a force acting on the third surface 60b from the pin head-side surface of the engagement aperture 26 or 28-defining edge of the side wall generates a force component which acts to displace the pin engagement hook 56 toward the center axis line 50a of the pin. As a result, removal of the lock pin 50 is easy.

[Operations and Technical Advantages of the Spacer]

Because the elastically deformable portion 76 is formed in the spacer 70 over the region from the spacer portions located closer to the center of the leg inserting aperture 72 than the ends of the leg inserting aperture 72 in the longitudinal direction of the spacer to the ends of the spacer 70, a range where the spacer 70 can be deformed, i.e., the longitudinal length of the elastically deformable portion 76 is longer than a longitudinal length of an elastically deformable portion of the conventional spacer.

As a result, the spacer can absorb a variance in a length between the body head 12 of the clip body 10 and the body 90 (a length of a neck) in the axial direction of the clip body, and can be applied to a clip body 10 having a long length of a neck. Further, it becomes unnecessary to elect a spacer for use, so as to match the length of the neck of the clip body. Further, a single type of fixing apparatus 1 can be commonly used for plural types of fixing apparatuses used for plural types of vehicles, and common use of the single type of fixing apparatus 1 to plural types of vehicles can be realized.

Further, because the elastically deformable portion 76 of the spacer 70 is curved or inclined and is formed thinner in thickness toward the longitudinal ends of the spacer 70, the elastically deformable portion 76 can be deformed substantially uniformly over an entire length of the elastically deformable portion. As a result, an elastic deformation amount in the axial direction of the clip body, of the elastically deformable portion 76 of the spacer 70 is effectively increased.

Further, since the protrusion 78 is formed at the spacer 70, when the spacer 70 is placed on a table with the protrusion facing the table and is taken out so as to be coupled to the clip body 10, the spacer can be stably placed on the table.

[Operations and Technical Advantages of the Fixing Apparatus Removing Structure]

Because the groove 44a is formed at the body engagement hook 44 and the groove has a groove bottom surface 44b which inclinedly extends from the outside surface 44a of the body engagement hook 44 toward the body head 12 and the center axis line 10a of the clip body, when pushing the groove bottom surface 44b by the tool 4, a force component which acts to displace the body engagement hook 44 toward the center axis line 10a of the clip body can be generated.

Because the groove bottom surface 44b is formed from the outside surface 44d of the body engagement hook 44 to the inside surface 44g of the body engagement hook 44, the center axis line-side end 44c of the groove bottom surface 44b can be located at a position which is visible through the lock pin inserting hole 20 from the opening of the lock pin inserting hole 20 in the plan view of the fixing apparatus 1. In this case, the center axis line-side end 44c of the groove bottom surface 44b is located on the side closer to the center axis line 10a of the clip body than the inside surfaces 20a, 20b and 20c of the lock pin inserting hole 20.

Because the center axis line-side end 44c of the groove bottom surface 44b is open toward a body head 12 through the lock pin inserting hole 20, the tool 4 can be inserted into the lock pin inserting hole 20 so as to reach the groove bottom surface 44b, and it is possible to push the groove bottom surface 44b with the tool 4.

Because the tool 4 includes the inclined portion 4e provided at the tip of the tool in the tool inserting direction into the lock pin inserting hole, due to the sliding contact of the inclined portion 4e of the tip of the tool with the inclined groove bottom surface 44b of the body engagement hook 44, the body engagement hook 44 is displaced toward the center axis line 10a of the clip body. As a result, by only pushing the groove bottom surface 44b in the axial direction of the clip body by the tool 4, the body engagement hook 44 can be displaced toward the center axis line 10a of the clip body so that the fixing apparatus 1 becomes removable from the vehicle body 90.

Further, because the tool 4 includes the forked portion 4a, and the inclined portion 4e inclinedly extends from the outside surface of the forked portion 4a toward the center of the forked portion in the width direction of the forked portion and in the direction opposite the tool inserting direction into the lock pin inserting hole 20, it is possible to displace the pair of body engagement hooks 44 toward the center axis line 10a of the clip body at the same time with each other, by only inserting the tool 4 into the lock pin inserting hole 20 and pushing the groove bottom surface 44b in the tool inserting direction.

Because the predetermined space is provided between the body engagement hook 44 and the back-up rib 48 in the direction perpendicular to the center axis line 10a of the clip body, the body engagement hook 44 can be displaced by the tool 4 until the outside surface 44d of the body engagement hook 44 comes to the outside surface of the body leg 40 or a position closer to the center axis line 10a of the body clip than the outside surface of the body leg. As a result, it is possible to remove the fixing apparatus 1 from the body 90.

Because the groove bottom surface 44b of the body engagement hook 44 is a concave surface and the inclined portion 4e of the tool 4 has a convex surface in the cross section perpendicular to the longitudinal direction of the inclined portion 4e, when the tool 4 is caused to slide relative to the groove bottom surface 44b of the engagement hook 44, the tool 4 is unlikely to stick to and to be non-slidable to the groove bottom surface 44b.

Because the protrusion 4f has such a height as causes the protrusion to interfere with the inside surface 20a of the lock pin inserting hole 20-defining wall or causes the protrusion to enter the holding aperture 26 or 28, when the fixing apparatus is removed, the fixing apparatus 1 can be extracted from the vehicle body 90 together with the tool 4 by only pulling the tool 4, due to the engagement of the protrusion 4f with the holding aperture 26, 28 or the abrasion between the protrusion 4f and the inside surface 20a of the lock pin inserting hole 20-defining wall.

The fixing apparatus 1 can be extracted from the vehicle body 90 by only a series of operations including pushing and pulling the tool 4. As a result, a removal work of the fixing apparatus 1 is easy and the body engagement hook 4 of the clip body 10 is prevented from being damaged. Therefore, it is possible to use the fixing apparatus again.

This technical advantage can be obtained also in the CSA fixing apparatus 2.

[Operations and Technical Advantages of the CSA Fixing Apparatus]

Similar operations and technical advantages can be obtained in the CSA fixing apparatus 2 also. More particularly, because the fixing apparatus 1 includes the extending portion 64 and the extending portion 64 extends from the end of the pin deformable portion 58 toward the pin head 52 in the axial direction of the lock pin, by pinching the pair of extending portions 64 at the outside surfaces of the extending portions by the tool 3 and then pulling, it is possible to easily remove the lock pin 50 from the lock pin inserting hole 20.

The fixing apparatus 1 according to the present invention is not limited to a fixing apparatus for fixing a CSA and is applicable to other fixing apparatuses of a lock pin type, for example, a fixing apparatus for fixing a CSA casing.

Explanation Of Reference Numerals 1 fixing apparatus
2 CSA fixing apparatus
3 lock pin removing tool
4 clip body removing tool
4a forked portion
4b outside surface of the forked portion
4c inside surface of the forked portion
4d tip of the forked portion
4e inclined portion
4f protrusion
5 fixing apparatus removing structure
10 clip body
10a center axis line of the clip body
12 body head
26 temporary holding aperture
28 secure holding aperture
20 central hole (lock pin inserting hole in a case where a lock pin is provided)
22 side wall
40 body leg
40a outside surface of the body leg
44 body engagement hook
44a groove
44b groove bottom surface
44c end of the groove bottom surface on a side of the center axis line of the clip body
44d outside surface of the body engagement hook
44g inside surface of the body engagement hook
48 back-up rib
50 lock pin
50a center axis line of the lock pin
52 pin head
54 pin leg
56 pin engagement hook
58 pin deformable portion
64 extending portion
66 connecting portion
66a fulcrum of deformation
70 spacer
72 leg inserting aperture
76 deformable portion
80 curtain airbag (CSA)
80b tab
90 vehicle body
90d fixing apparatus mounting aperture

The invention claimed is:

1. A fixing apparatus comprising a clip body, the clip body including a body head and a body leg, the body head and the body leg being arranged in a direction along a center axis line of the clip body, the clip body including a central hole extending over the body head and the body leg and being open at a body head-side end of the central hole, the body leg including a body engagement hook that is elastically deformable in a direction perpendicular to the center axis line of the clip body, the clip body being removable from a vehicle body by a clip body removing tool, wherein a groove is formed at the body engagement hook, the groove having a groove bottom surface which inclinedly extends from an outside surface of the body engagement hook toward the body head and the center axis line of the clip body.

2. The fixing apparatus according to claim 1, wherein the groove is formed at a central portion of the body engagement hook in a width direction of the body engagement hook.

3. The fixing apparatus according to claim 1, wherein a portion of the groove bottom surface including a center axis line-side end of the groove bottom surface is open toward an outside of the body head through the central hole, so that in a situation where the clip body is removed from the vehicle body, by inserting the tool into the central hole, the portion of the groove bottom surface including the center axis line-side end of the groove bottom surface can be pushed.

4. The fixing apparatus according to claim 1, wherein the body engagement hook includes the outside surface and an inside surface located closer to the center axis line of the clip body than the outside surface, and the groove bottom surface extends from the outside surface of the body engagement hook to the inside surface of the body engagement hook.

5. The fixing apparatus according to claim 1, wherein the clip body includes a back-up rib provided on a center axis line-side of the body engagement hook, a predetermined space being provided between the body engagement hook and the back-up rib in the direction perpendicular to the center axis line of the clip body, the predetermined space being set such that by displacing the body engagement hook toward the center axis line of the clip body using the tool, the outside surface of the body engagement hook is locatable at a position equal to an outside surface of the body leg or closer to the center axis line of the clip body than the outside surface of the body leg.

6. The fixing apparatus according to claim 1, wherein the fixing apparatus includes a lock pin, and the central hole is a lock pin inserting hole where the lock pin is inserted.

7. The fixing apparatus according to claim 6, wherein
the body head of the clip body includes a side wall surrounding the lock pin inserting hole from a lateral side of the lock pin inserting hole,
a temporary holding aperture for temporarily holding the lock pin when the lock pin is inserted into the lock pin inserting hole and a secure holding aperture for securely holding the lock pin located inner than the temporary holding aperture in the lock pin-inserting direction are both provided at the side wall, and
a pin head of the lock pin is surrounded by the side wall so that the pin head of the lock pin does not protrude upward from the clip body and is not exposed to a lateral side of the clip body when the lock pin engages the temporary holding aperture.

8. The fixing apparatus according to claim 6, wherein the lock pin includes:
a pin head;
a pin leg extending in a lock pin inserting direction from the pin head into the lock pin inserting hole;
a pin deformable portion extending from a pin leg-connecting portion of the pin deformable portion toward the pin head and being elastically deformable about the pin leg-connecting portion of the pin deformable portion in a direction perpendicular to an axial direction of the lock pin;
a pin engagement hook projecting from an outside surface of the pin deformable portion in a direction away from a center axis line of the lock pin; and
an extending portion extending from a portion of the pin deformable portion where the pin engagement hook is formed toward the pin head in the axial direction of the lock pin, the extending portion being pinchable by a lock pin removing tool for removing the lock pin.

9. The fixing apparatus according to claim 1, further comprising a spacer including a leg inserting aperture at a central portion of the spacer, wherein:

the spacer is capable of fitting with the body leg at the leg inserting aperture, and
the spacer includes an elastically deformable portion elastically deformable in an axial direction of the clip body, and
the elastically deformable portion is formed from opposite spacer portions located closer to a center of the leg inserting aperture than opposite ends of the leg inserting aperture in a direction parallel to one direction of the spacer in a plan view of the spacer to opposite ends of the spacer in the one direction of the spacer in the plan view of the spacer.

10. A fixing apparatus-removing structure comprising:
the fixing apparatus according to claim 1, and
a tool used for removing the fixing apparatus from the vehicle body,
wherein the tool includes an inclined portion, provided at a tip of the tool in a tool inserting direction into the central hole, the tool being insertable into the central hole and adapted to push the groove bottom surface, thereby displacing the body engagement hook toward the center axis line of the clip body.

11. The fixing apparatus-removing structure according to claim 10, wherein the tool has a shape of a flat plate and the tool is manufactured by punching a flat plate material using a stamping machine.

12. The fixing apparatus-removing structure according to claim 10, wherein
the tool includes a forked portion provided at the tip of the tool in the tool inserting direction into the central hole, and the inclined portion is formed at a tip of the forked portion in the tool inserting direction into the central hole, and
the inclined portion of the tool inclinedly extends in a direction from an outside surface of the forked portion toward a center of the forked portion in the width direction of the forked portion and in a direction opposite the tool inserting direction into the central hole.

13. The fixing apparatus-removing structure according to claim 10, wherein the groove bottom surface of the body engagement hook has a concave surface that is concave in a direction toward the body head in a cross section perpendicular to a longitudinal direction of the groove, and the inclined portion of the tool has a convex surface that is convex relative to the groove bottom surface in a cross section perpendicular to a longitudinal direction of the inclined portion.

14. The fixing apparatus-removing structure according to claim 10, wherein, in a situation where the tool is inserted into the central hole, the tool has a protrusion which protrudes toward an inside surface of the central hole at a tool surface facing the inside surface of the central hole, and the protrusion has such a height in a direction perpendicular to the center axis line of the clip body as causes the protrusion to interfere with the inside surface of the central hole or causes the protrusion to enter a temporary holding aperture or a secure holding aperture formed at a wall of the central hole.

15. A curtain airbag fixing apparatus for fixing a curtain airbag to a vehicle body using the fixing apparatus according to claim 1.

* * * * *